US007753039B2

(12) United States Patent
Harima et al.

(10) Patent No.: US 7,753,039 B2
(45) Date of Patent: Jul. 13, 2010

(54) EXHAUST GAS CONTROL APPARATUS OF AN INTERNAL COMBUSTION ENGINE

(75) Inventors: Kenji Harima, Numazu (JP); Shigeki Miyashita, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 58 days.

(21) Appl. No.: 12/086,751

(22) PCT Filed: Jun. 8, 2007

(86) PCT No.: PCT/IB2007/001543

§ 371 (c)(1),
(2), (4) Date: Jun. 19, 2008

(87) PCT Pub. No.: WO2007/141646

PCT Pub. Date: Dec. 13, 2007

(65) Prior Publication Data

US 2009/0320813 A1 Dec. 31, 2009

(30) Foreign Application Priority Data

Jun. 8, 2006 (JP) ............................ 2006-159627

(51) Int. Cl.
*F02D 41/00* (2006.01)
*F02D 41/22* (2006.01)

(52) U.S. Cl. ...................................... 123/676; 123/443

(58) Field of Classification Search ................ 123/672, 123/676, 54.4, 443; 60/605.1, 285, 286, 60/287, 299, 598, 599
See application file for complete search history.

(56) References Cited

U.S. PATENT DOCUMENTS 3,943,710 A * 3/1976 Lange ........................ 60/288
4,134,261 A * 1/1979 Iizuka et al. .................. 60/276
5,582,004 A * 12/1996 Rutschmann ................ 60/288
6,557,341 B2 * 5/2003 Bubeck et al. ................ 60/284
6,938,729 B2 * 9/2005 Worner et al. ............... 181/254
2005/0011193 A1 1/2005 Pagot
2007/0193269 A1 * 8/2007 Endres et al. .............. 60/605.1

(Continued)

FOREIGN PATENT DOCUMENTS

EP 716221 A1 * 6/1996

(Continued)

*Primary Examiner*—Mahmoud Gimie
(74) *Attorney, Agent, or Firm*—Oliff & Berridge, PLC

(57) ABSTRACT

A first cylinder and a second cylinder are provided. A first exhaust pipe is connected to the first cylinder and a second exhaust pipe is connected to the second cylinder. A communicating pipe connects together an intermediate portion of the first exhaust pipe with an intermediate portion of the second exhaust pipe. An exhaust gas control catalyst is arranged in the second exhaust pipe downstream of the portion to which the communicating pipe is connected. Exhaust gas amount reducing devices are provided which reduce the amount of exhaust gas that flows from the first exhaust pipe into the second exhaust pipe through the communicating pipe during execution of rich/lean burn control which performs combustion with an air-fuel ratio of an air-fuel mixture that is richer than the stoichiometric air-fuel ratio in one of the first cylinder and second cylinder and performs combustion with an air-fuel ratio of an air-fuel mixture that is leaner than the stoichiometric air-fuel ratio in the other cylinder.

33 Claims, 16 Drawing Sheets

U.S. PATENT DOCUMENTS

2009/0038293 A1* 2/2009 Miyashita .................... 60/287
2009/0145116 A1* 6/2009 Miyashita et al. ............. 60/286

FOREIGN PATENT DOCUMENTS

EP 1 498 590 A1 1/2005
GB 1164018 9/1969
JP B2 1-27246 5/1989
JP U 1-173423 12/1989

* cited by examiner

EXHAUST GAS CONTROL APPARATUS OF AN INTERNAL COMBUSTION ENGINE

BACKGROUND OF THE INVENTION

1. Field of the Invention

The invention relates to an exhaust gas control apparatus of an internal combustion engine.

2. Description of the Related Art Japanese Examined Patent Publication No. 1-27246 describes an internal combustion engine provided with an exhaust gas control apparatus. This internal combustion engine has two sets of cylinders, with three cylinders in each set. Each set of cylinders is connected to an independent exhaust pipe and a catalyst is arranged in one of these exhaust pipes. The other exhaust pipe, i.e., the exhaust pipe without the catalyst, is connected at the downstream end portion to the exhaust pipe in which the catalyst is arranged, i.e., the exhaust pipe with the catalyst. Further, the exhaust pipe without the catalyst is connected via a communicating pipe upstream of the catalyst to the exhaust pipe with the catalyst. As a result, exhaust gas discharged from the cylinders into the exhaust pipe without the catalyst can flow into the exhaust pipe with the catalyst both upstream of the catalyst via the communicating pipe and downstream of the catalyst without passing through the communicating pipe. That is, in the internal combustion engine described in Japanese Examined Patent Publication No. 1-27246, exhaust gas that was discharged from the cylinders into the exhaust pipe without the catalyst may flow through the catalyst and may also bypass the catalyst.

If the exhaust gas control catalyst which purifies components in the exhaust gas overheats, the purification efficiency of the exhaust gas control catalyst decreases, as described in Japanese Utility Model Application Publication No. JP-U-1-173423, for example. Therefore, there is a need to prevent the exhaust gas control catalyst from overheating in an exhaust gas control apparatus of an internal combustion engine provided with an exhaust gas control catalyst. Also, one known exhaust gas control catalyst purifies exhaust gas when the temperature of the exhaust gas control catalyst is within an appropriate temperature range. Thus, there is a need to control the temperature of the exhaust gas control catalyst to within the appropriate temperature range in an exhaust gas control apparatus of an internal combustion engine provided with this kind of exhaust gas control catalyst. Further, it may be necessary to raise the temperature of the exhaust gas control catalyst in order to achieve a specific objet. Moreover, it may be necessary to lower the temperature of the exhaust gas control catalyst in order to achieve a specific object.

There is also a need for an exhaust gas control apparatus of an internal combustion engine provided with two cylinders, which allows exhaust gas discharged from both cylinders to flow into an exhaust gas control catalyst.

SUMMARY OF THE INVENTION

This invention thus provides an exhaust gas control apparatus of an internal combustion engine provided with two cylinders, which allows exhaust gas discharged from both cylinders to flow into an exhaust gas control catalyst, and further, which is able to prevent the exhaust gas control catalyst from overheating, or control the temperature of the exhaust gas control catalyst to within an appropriate temperature range, or raise the temperature of the exhaust gas control catalyst, or lower the temperature of the exhaust gas control catalyst.

A first aspect of the invention relates to an exhaust gas control apparatus of an internal combustion engine having a first cylinder and a second cylinder, which includes a first exhaust pipe connected to the first cylinder; a second exhaust pipe connected to the second cylinder; a communicating pipe that connects together an intermediate portion of the first exhaust pipe and an intermediate portion of the second exhaust pipe; an exhaust gas control catalyst arranged in the second exhaust pipe downstream of the intermediate portion to which the communicating pipe is connected; and an exhaust gas amount reducing device which reduces an amount of exhaust gas that flows from the first exhaust pipe into the second exhaust pipe through the communicating pipe during execution of a rich/lean burn control which performs combustion with an air-fuel ratio of an air-fuel mixture that is richer than the stoichiometric air-fuel ratio in one of the first cylinder and second cylinder, and performs combustion with an air-fuel ratio of an air-fuel mixture that is leaner than the stoichiometric air-fuel ratio in the other cylinder.

In the first aspect, the exhaust gas amount reducing device may reduce the amount of exhaust gas that flows from the first exhaust pipe into the second exhaust pipe through the communicating pipe when a temperature of the exhaust gas control catalyst is higher than a predetermined temperature.

In the first aspect, the exhaust gas amount reducing device may reduce the amount of exhaust gas that flows from the first exhaust pipe into the second exhaust pipe through the communicating pipe by increasing a pressure in the second exhaust pipe upstream of the exhaust gas control catalyst.

In this structure, an exhaust gas control valve which changes a flow path area of the second exhaust pipe may be arranged in the second exhaust pipe downstream of the intermediate portion to which the communicating pipe is connected, and the exhaust gas amount reducing device may increase the pressure in the second exhaust pipe upstream of the exhaust gas control catalyst by reducing the flow path area of the second exhaust pipe using the exhaust gas control valve.

In the first aspect of the invention, the exhaust gas amount reducing device may reduce the amount of exhaust gas that flows from the first exhaust pipe into the second exhaust pipe through the communicating pipe by decreasing the pressure in the first exhaust pipe upstream of the intermediate portion to which the communicating pipe is connected.

In this structure, an exhaust gas control valve which changes the flow path area of the first exhaust pipe may be arranged in the first exhaust pipe downstream of the intermediate portion to which the communicating pipe is connected, and the exhaust gas amount reducing device may decrease the pressure in the first exhaust pipe upstream of the intermediate portion to which the communicating pipe is connected by increasing the flow path area of the first exhaust pipe using the exhaust gas control valve.

In the first aspect, an exhaust turbine of a turbocharger may be arranged in the first exhaust pipe downstream of the intermediate portion to which the communicating pipe is connected.

In the foregoing structure, an exhaust turbine of a turbocharger may be arranged in the first exhaust pipe downstream of the intermediate portion to which the communicating pipe is connected, and the exhaust gas amount reducing device may decrease the pressure in the first exhaust pipe upstream of the intermediate portion to which the communicating pipe is connected by increasing an opening amount of a wastegate valve of the turbocharger.

In either of these structures, a communication control valve which changes a flow path area of the communicating pipe may be arranged in the communicating pipe, and the exhaust gas amount reducing device may reduce the amount of exhaust gas that flows from the first exhaust pipe into the second exhaust pipe through the communicating pipe by reducing the flow path area of the communicating pipe using the communication control valve.

In the first aspect, a single common exhaust pipe may be connected to a downstream end of the first exhaust pipe and a downstream end of the second exhaust pipe, and an exhaust gas control catalyst which is separate from the exhaust gas control catalyst may be arranged in the common exhaust pipe. Further, the rich/lean burn control may be executed so as to supply exhaust gas of a rich air-fuel ratio and exhaust gas of a lean air-fuel ratio to the exhaust gas control catalyst arranged in the common exhaust pipe.

A second aspect of the invention relates to an exhaust gas control apparatus of an internal combustion engine having a first cylinder and a second cylinder, which includes a first exhaust pipe connected to the first cylinder, a second exhaust pipe connected to the second cylinder; a communicating pipe that connects together an intermediate portion of the first exhaust pipe and an intermediate portion of the second exhaust pipe; a single common exhaust pipe which is connected to a downstream end of the first exhaust pipe and a downstream end of the second exhaust pipe; an exhaust gas control catalyst arranged in the common exhaust pipe; an exhaust turbine of a turbocharger, which is arranged in the first exhaust pipe downstream of the intermediate portion to which the communicating pipe is connected; and an exhaust gas amount control apparatus which executes an exhaust gas control that controls i) an amount of exhaust gas that flows through the first exhaust pipe and into the exhaust gas control catalyst from the downstream end of the first exhaust pipe and ii) the amount of exhaust gas that flows through the second exhaust pipe and into the exhaust gas control catalyst from the downstream end of the second exhaust pipe such that a temperature of the exhaust gas control catalyst becomes equal to or close to a target temperature.

In the second aspect, the exhaust gas amount control apparatus may control i) the amount of exhaust gas that flows through the first exhaust pipe and into the exhaust gas control catalyst from the downstream end of the first exhaust pipe and ii) the amount of exhaust gas that flows through the second exhaust pipe and into the exhaust gas control catalyst from the downstream end of the second exhaust pipe by controlling a pressure in the first exhaust pipe.

In this structure, an exhaust gas control valve which changes a flow path area of the first exhaust pipe may be arranged in the first exhaust pipe downstream of the intermediate portion to which the communicating pipe is connected, and the exhaust gas amount control apparatus may control the pressure in the first exhaust pipe by controlling an opening amount of the exhaust gas control valve.

In either of these structures, the turbocharger may include a wastegate valve, and the exhaust gas amount control apparatus may control the pressure in the first exhaust pipe by controlling the opening amount of the wastegate valve.

In the second aspect, the exhaust gas amount control apparatus may control i) the amount of exhaust gas that flows through the first exhaust pipe and into the exhaust gas control catalyst from the downstream end of the first exhaust pipe and ii) the amount of exhaust gas that flows through the second exhaust pipe and into the exhaust gas control catalyst from the downstream end of the second exhaust pipe by controlling the pressure in the second exhaust pipe.

In this structure, an exhaust gas control valve which changes the flow path area of the second exhaust pipe may be arranged in the second exhaust pipe downstream of the intermediate portion to which the communicating pipe is connected, and the exhaust gas amount control apparatus may control the pressure in the second exhaust pipe by controlling the opening amount of the exhaust gas control valve.

In the second aspect, the exhaust gas amount control apparatus may increase the amount of exhaust gas that flows through the first exhaust pipe and into the exhaust gas control catalyst from the downstream end of the first exhaust pipe when a temperature of the exhaust gas control catalyst is higher than a target temperature, and increase the amount of the exhaust gas that flows through the second exhaust pipe and into the exhaust gas control catalyst from the downstream end of the second exhaust pipe when the temperature of the exhaust gas control catalyst is lower than the target temperature.

In the second aspect, the exhaust gas amount control apparatus may control, in accordance with a load of the internal combustion engine during execution of the exhaust gas amount control the amount of exhaust gas that flows through the first exhaust pipe and into the exhaust gas control catalyst from the downstream end of the first exhaust pipe such that the amount of exhaust gas that passes through the exhaust turbine of the turbocharger becomes equal to or close to a target amount.

A third aspect of the invention relates to an exhaust gas control apparatus of an internal combustion engine having a first cylinder and a second cylinder, which includes a first exhaust pipe connected to the first cylinder; a second exhaust pipe connected to the second cylinder; a communicating pipe that connects together an intermediate portion of the first exhaust pipe and an intermediate portion of the second exhaust pipe; a single common exhaust pipe which is connected to a downstream end of the first exhaust pipe and a downstream end of the second exhaust pipe; an exhaust gas control catalyst arranged in the common exhaust pipe; an exhaust turbine of a turbocharger, which is arranged in the first exhaust pipe downstream of the intermediate portion to which the communicating pipe is connected, wherein a rich/lean burn control is executed which performs combustion with an air-fuel ratio of an air-fuel mixture that is richer than the stoichiometric air-fuel ratio in one of the first cylinder and second cylinder, and performs combustion with an air-fuel ratio of an air-fuel mixture that is leaner than the stoichiometric air-fuel ratio in the other cylinder, and exhaust gas of a rich air-fuel ratio and exhaust gas of a lean air-fuel ratio are supplied to the exhaust gas control catalyst in order to raise the temperature of the exhaust gas control catalyst when the exhaust gas control catalyst is in a predetermined state; and an exhaust gas amount control apparatus which executes an exhaust gas amount control that increases the amount of exhaust gas that flows through the second exhaust pipe and into the exhaust gas control catalyst from the downstream end of the second exhaust pipe before the rich/lean burn control is executed.

In the third aspect, the exhaust gas amount control apparatus may increase the amount of exhaust gas that flows through the second exhaust pipe and into the exhaust gas control catalyst from the downstream end of the second exhaust pipe by decreasing the pressure in the second exhaust pipe.

In this structure, an exhaust gas control valve which changes a flow path area of the second exhaust pipe may be arranged in the second exhaust pipe downstream of the intermediate portion to which the communicating pipe is connected, and the exhaust gas amount control apparatus may decrease the pressure in the second exhaust pipe by increasing an opening amount of the exhaust gas control valve.

In the third aspect, the exhaust gas amount control apparatus may increase the amount of exhaust gas that flows through the second exhaust pipe and into the exhaust gas control catalyst from the downstream end of the second exhaust pipe by increasing the pressure in the first exhaust pipe.

In this structure, an exhaust gas control valve which changes the flow path area of the first exhaust pipe may be arranged in the first exhaust pipe downstream of the intermediate portion to which the communicating pipe is connected, and the exhaust gas amount control apparatus may increase the pressure in the first exhaust pipe by reducing the opening amount of the exhaust gas control valve.

In either of these structures, the turbocharger may include a wastegate valve, and the exhaust gas amount control apparatus may increase the pressure in the first exhaust pipe by reducing an opening amount of the wastegate valve.

In the third aspect, combustion in which the air-fuel ratio of the air-fuel mixture is the stoichiometric air-fuel ratio may be performed in the second cylinder when the exhaust gas amount control apparatus is executing the exhaust gas amount control.

In this structure, combustion in which the air-fuel ratio of the air-fuel mixture is the stoichiometric air-fuel ratio may be performed in the first cylinder when the exhaust gas amount control apparatus is executing the exhaust gas amount control.

A fourth aspect of the invention relates to an exhaust gas control apparatus of an internal combustion engine having a first cylinder and a second cylinder, which includes a first exhaust pipe connected to the first cylinder; a second exhaust pipe connected to the second cylinder, a communicating pipe that connects together an intermediate portion of the first exhaust pipe and an intermediate portion of the second exhaust pipe; a single common exhaust pipe which is connected to a downstream end of the first exhaust pipe and a downstream end of the second exhaust pipe; an exhaust gas control catalyst arranged in the common exhaust pipe; an exhaust turbine of a turbocharger, which is arranged in the first exhaust pipe downstream of the intermediate portion to which the communicating pipe is connected, wherein a rich/lean burn control is executed which performs combustion with an air-fuel ratio of an air-fuel mixture that is richer than the stoichiometric air-fuel ratio in one of the first cylinder and second cylinder, and performs combustion with an air-fuel ratio of an air-fuel mixture that is leaner than the stoichiometric air-fuel ratio in the other cylinder, and exhaust gas of a rich air-fuel ratio and exhaust gas of a lean air-fuel ratio are supplied to the exhaust gas control catalyst in order to raise the temperature of the exhaust gas control catalyst when the exhaust gas control catalyst is in a predetermined state; and an exhaust gas amount control apparatus which executes an exhaust gas amount control that increases the amount of exhaust gas that flows through the first exhaust pipe and into the exhaust gas control catalyst from the downstream end of the first exhaust pipe when the rich/lean burn control has ended.

In the fourth aspect, the exhaust gas amount control apparatus may increase the amount of exhaust gas that flows through the first exhaust pipe and into the exhaust gas control catalyst from the downstream end of the first exhaust pipe by decreasing the pressure in the first exhaust pipe.

In this structure, an exhaust gas control valve which changes a flow path area of the first exhaust pipe may be arranged in the first exhaust pipe downstream of the intermediate portion to which the communicating pipe is connected, and the exhaust gas amount control apparatus may decrease the pressure in the first exhaust pipe by increasing an opening amount of the exhaust gas control valve.

In either of these structures, the turbocharger may include a wastegate valve, and the exhaust gas amount control apparatus may decrease the pressure in the first exhaust pipe by increasing the opening amount of the wastegate valve.

In the fourth aspect, the exhaust gas amount control apparatus may increase the amount of exhaust gas that flows through the first exhaust pipe and into the exhaust gas control catalyst from the downstream end of the first exhaust pipe by increasing the pressure in the second exhaust pipe.

In this structure, an exhaust gas control valve which changes the flow path area of the second exhaust pipe may be arranged in the second exhaust pipe downstream of the intermediate portion to which the communicating pipe is connected, and the exhaust gas amount control apparatus may increase the pressure in the second exhaust pipe by reducing the opening amount of the exhaust gas control valve.

According to the first aspect of the invention, large amounts of both exhaust gas of a rich air-fuel ratio and exhaust gas of a lean air-fuel ratio are suppressed from flowing into the exhaust gas control catalyst arranged in the second exhaust pipe, thus preventing the exhaust gas control catalyst from overheating.

According to the second aspect of the invention, the temperature of the exhaust gas control catalyst is controlled to within an appropriate temperature range.

According to the third aspect of the invention, the amount of exhaust gas that flows into the exhaust gas control catalyst without passing through the turbocharger is increased, which raises the temperature of the exhaust gas control catalyst.

According to the fourth aspect of the invention, the amount of exhaust gas that passes through the exhaust gas control catalyst after passing through the turbocharger is increased, which lowers the temperature of the exhaust gas control catalyst.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
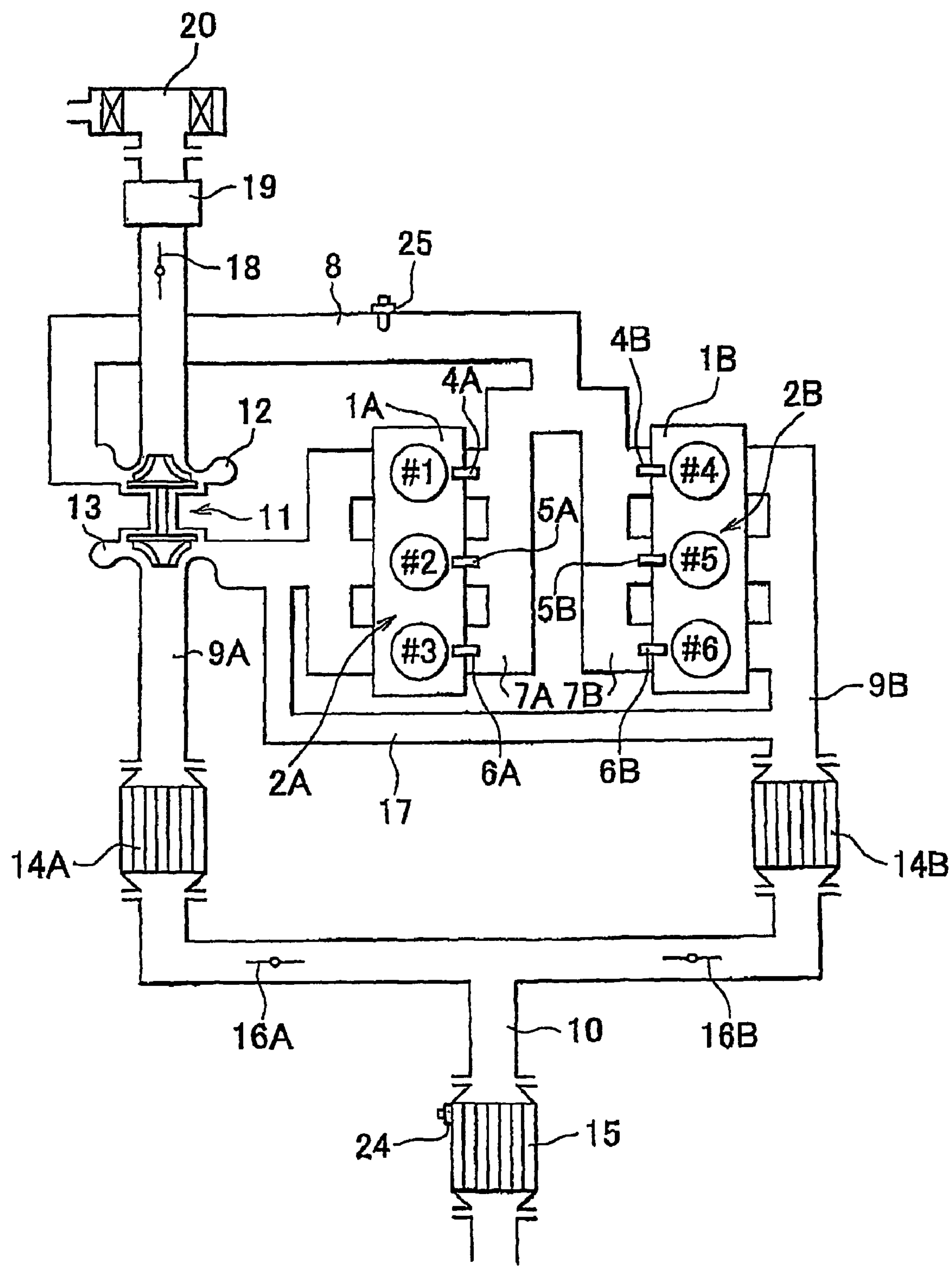
FIG. 1 is a block diagram schematically showing the structure of an internal combustion engine to which an exhaust gas control apparatus according to a first example embodiment of the invention can be applied.
Figure 2:
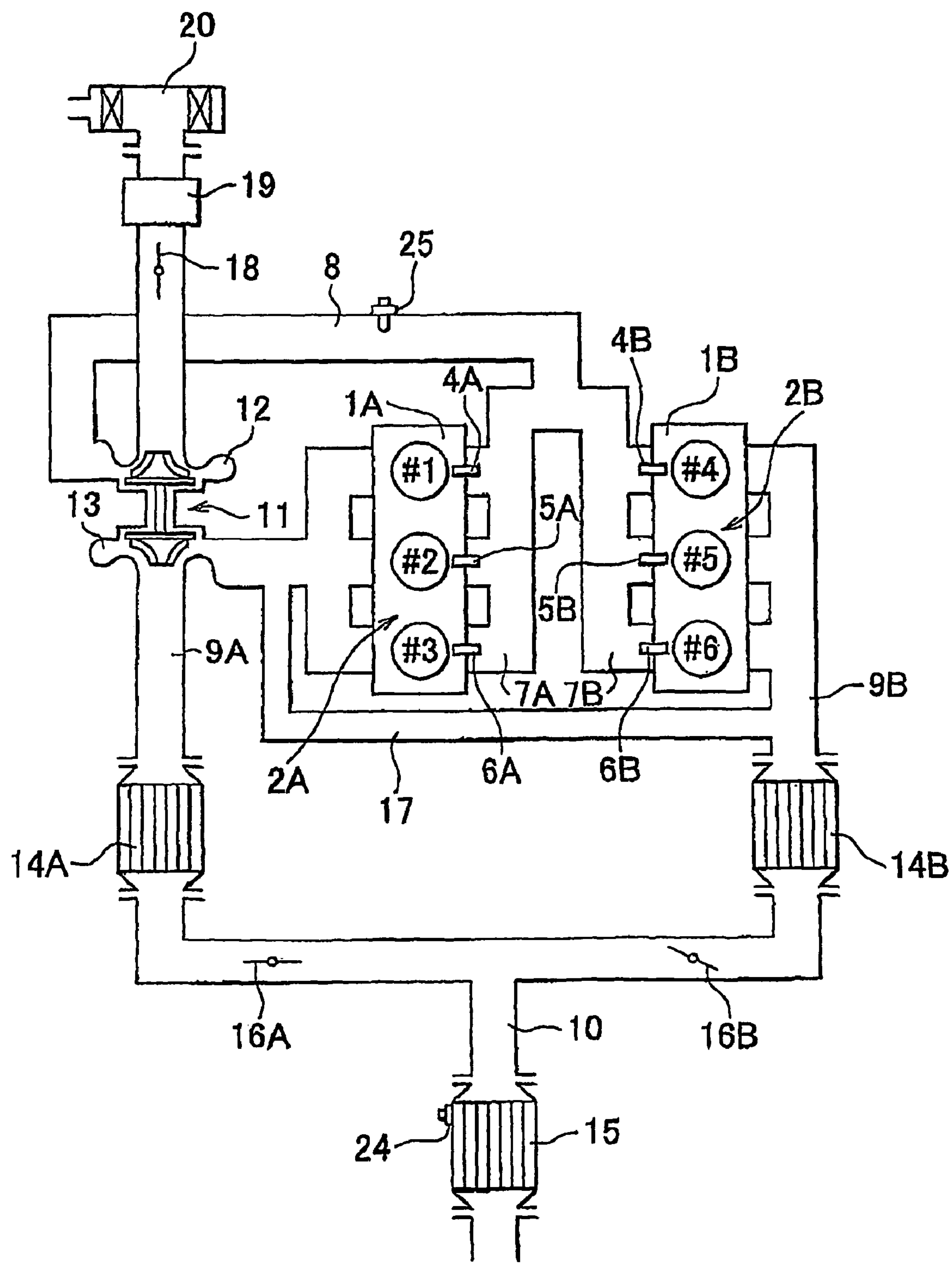
FIG. 2 is a block diagram similar to FIG. 1 but which shows the exhaust gas control apparatus when S (sulfur) poisoning regeneration control is being executed.

In the following description and the accompanying drawings, the present invention will be described in more detail in terms of exemplary embodiments. FIG. 1 is a block diagram schematically showing the structure of an internal combustion engine to which an exhaust gas control apparatus according to a first example embodiment of the invention can be applied. The internal combustion engine shown in FIG. 1 is a so-called V type internal combustion engine which has two banks 1A and 1B. Bank 1A has three cylinders #1 to #3 which form a cylinder group 2A. Bank 1B also has three cylinders #4 to #6 which form another cylinder group 2B. The cylinders #1 to #3 in the one cylinder group 2A are each provided with a fuel injection valve 4A, 5A, and 6A, respectively. Similarly, the cylinders #4 to #6 of the other cylinder group 2B are also each provided with a fuel injection valve 4B, 5B, and 6B. Also, one cylinder group 2A is connected to an intake pipe 8 via an intake branch pipe 7A, while the other cylinder group 2B is connected to the intake pipe 8 via an intake branch pipe 7B. The one cylinder group 2A is also connected to an exhaust pipe 10 via an exhaust branch pipe 9A, while the other cylinder group 2B is connected to the exhaust pipe 10 via an exhaust branch pipe 9B.

Further, the internal combustion engine shown in the drawing is provided with a turbocharger 11. A compressor 12 of the turbocharger 11 is arranged in the intake branch pipe 7A that is connected to the one cylinder group 2A. An exhaust turbine 13 of the turbocharger 11 is arranged in the exhaust branch pipe 9A that is connected to the one cylinder group 2A. A three way catalyst 14A is arranged downstream of the exhaust turbine 13 in the exhaust branch pipe 9A with the exhaust turbine 13 (hereinafter this exhaust branch pipe will be referred to as the "turbocharged side exhaust branch pipe"). A three way catalyst 14B is also arranged in the exhaust branch pipe without the exhaust turbine 13 (hereinafter this exhaust branch pipe will be referred to as the "naturally-aspirated side exhaust branch pipe"). Also, a NOx catalyst 15 to which is mounted a temperature sensor 24 for detecting the pressure of the NOx catalyst 15 is arranged in the exhaust pipe 10.

Moreover, an exhaust gas control valve 16A is arranged in the exhaust branch pipe 9A downstream of the three way catalyst 14A. Similarly, an exhaust gas control valve 16B is arranged in the exhaust branch pipe 9B downstream of the three way catalyst 14B. When these exhaust gas control valves 16A and 16B are fully open, they completely open the inside passages of the exhaust branch pipes 9A and 9B, allowing the maximum amount of exhaust gas to flow downstream of the exhaust gas control valves. On the other hand, when the exhaust gas control valves 16A and 16B are fully closed, they completely close off the inside passages of the exhaust branch pipes 9A and 9B, preventing exhaust gas from flowing downstream of the exhaust gas control valves.

Further, a portion of the exhaust branch pipe 9A with the exhaust turbine 13 which is upstream of the exhaust turbine 13 is connected via a communicating pipe 17 to a portion of the exhaust branch pipe 9B without the exhaust turbine 13 which is upstream of the three way catalyst 14B. Also, a throttle valve 18, an airflow meter 19, and an air cleaner 20 are arranged in the intake pipe 8. Also, a pressure sensor 25 that detects the pressure in the intake pipe 8 is mounted in the intake pipe 8 downstream of the compressor 12 of the turbocharger 11.

The exhaust gas control valves 16A and 16B are controlled according to the operating state of the internal combustion engine. For example, when maximum turbocharging effect from the turbocharger 11 is desired, the exhaust gas control valve 16A in the turbocharged side exhaust branch pipe 9A (hereinafter this exhaust gas control valve will be referred to as the "turbocharged side exhaust gas control valve") is fully opened while the exhaust gas control valve 16B in the naturally-aspirated side exhaust branch pipe 9B (hereinafter this exhaust gas control valve will be referred to as the "naturally-aspirated side exhaust gas control valve") is fully closed. As a result, all of the exhaust gas discharged from the cylinder group 2B that is connected to the naturally-aspirated exhaust branch pipe 9B (hereinafter this cylinder group will be referred to as the "naturally-aspirated side cylinder group") to the naturally-aspirated side exhaust branch pipe 9B is supplied to the turbocharged side exhaust branch pipe 9A via the communicating pipe 17 so the maximum turbocharging effect is able to be achieved from the turbocharger 11. On the other hand, if the minimum effect of the turbocharger 11 is desired, the turbocharged side exhaust gas control valve 16A is fully closed while the naturally-aspirated exhaust gas control valve 16B is fully opened. As a result, all of the exhaust gas discharged from the cylinder group 2A that is connected to the turbocharged exhaust branch pipe 9A (hereinafter this cylinder group will be referred to as the "turbocharged side cylinder group") to the turbocharged side exhaust branch pipe 9A is supplied to the naturally-aspirated side exhaust branch pipe 9B via the communicating pipe 17 so the turbocharging effect from the turbocharger 11 is minimized. In this way the turbocharging effect of the turbocharger 11 can be controlled by appropriately controlling the opening amounts of the exhaust gas control valves 16A and 16B.

Also, the three way catalysts 14A and 14B purify NOx (oxides of nitrogen), CO (carbon monoxide), and HC (hydrocarbons) in the exhaust gas simultaneously with high purification efficiency when the temperatures of the three way catalysts 14A and 14B are equal to or greater than so-called activation temperatures and the air-fuel ratio of the exhaust gas flowing into those three way catalysts 14A and 14B is near the stoichiometric air-fuel ratio.

Also, the NOx catalyst 15 retains NOx in the exhaust gas through absorption or adsorption when the temperature of the NOx catalyst 15 is within a certain temperature range and the air-fuel ratio of the exhaust gas flowing into the NOx catalyst 15 is leaner than the stoichiometric air-fuel ratio. On the other hand, when the temperature of the NOx catalyst 15 is equal to or greater than the socalled activation temperature and the air-fuel ratio of the exhaust gas flowing into the NOx catalyst 15 is equal to or richer than the stoichiometric air-fuel ratio, the NOx catalyst 15 purifies the retained NOx by reducing it with a reducing agent (such as HC) in the exhaust gas. In the following description, the lower limit value of the temperature range within which the NOx catalyst 15 retains and purifies NOx will be referred to as the "activation temperature" and the upper limit value will be referred to as the "NOx retaining and purifying upper limit temperature".

Exhaust gas also contains SOx (sulfur oxides). The NOx catalyst 15 therefore also ends up retaining SOx in the exhaust gas through adsorption or absorption, in addition to NOx. When the NOx catalyst 15 retains SOx in this way, the maximum amount of NOx that the NOx catalyst 15 can retain is reduced by that amount. On the other hand, SOx is released from the NOx catalyst 15 when the temperature of the NOx catalyst 15 (hereinafter referred to as the "NOx catalyst temperature") reaches a certain temperature (this temperature is higher than the activation temperature of the NOx catalyst 15) and the air-fuel ratio of the exhaust gas flowing into the NOx catalyst 15 is equal to or richer than the stoichiometric air-fuel ratio. Therefore, when the amount of SOx retained in the NOx catalyst 15 reaches a given fixed amount, a process is performed to release the SOx from the NOx catalyst 15 (hereinafter this process will be referred to as "S poisoning regeneration control").

That is, in the S poisoning regeneration control of the exhaust gas control apparatus according to the first example embodiment, combustion in which the air-fuel ratio of the air-fuel mixture is richer than the stoichiometric air-fuel ratio hereinafter this combustion will be referred to as "rich combustion" or "rich burn") is performed in one cylinder group, while combustion in which the air-fuel ratio is leaner than the stoichiometric air-fuel ratio (hereinafter this combustion will be referred to as "lean combustion" or "lean burn") is performed in the other cylinder group. At this time, the degree of richness of the air-fuel mixture during the rich combustion and the degree of leanness of the air-fuel mixture during the lean combustion are controlled so that the average air-fuel ratio of the exhaust gas that flows into the NOx catalyst is equal to or richer than the stoichiometric air-fuel ratio. As a result, the exhaust gas discharged from the cylinder group for which rich combustion is performed (hereinafter referred to as the "rich burn cylinder group") contains a large amount of HC (hydrocarbons), and the exhaust gas discharged from the cylinder group for which lean combustion is performed (hereinafter referred to as the "lean burn cylinder group") contains a large amount of oxygen. The HC and oxygen react in the NOx catalyst, generating heat which raises the NOx catalyst temperature. Then when the NOx catalyst temperature reaches the temperature at which SOx is released (hereinafter this temperature will be referred to as the "SOx releasing temperature"), SOx is released from the NOx catalyst 15 because the average air-fuel ratio of the exhaust that flows into the NOx catalyst 15 at this time is equal to or richer than the stoichiometric air-fuel ratio.

Furthermore, in the S poisoning regeneration control of the exhaust gas control apparatus in this first example embodiment, S poisoning regeneration opening amount control is performed which controls the opening amounts of both exhaust gas control valves 16A and 16B so that the exhaust gas resistance against the exhaust gas discharged from the naturally-aspirated side cylinder groups 2B (hereinafter referred to as the "naturally-aspirated side exhaust gas resistance") is equal to or at least close to the exhaust gas resistance against the exhaust gas discharged from the turbocharged side cylinder group 2A (hereinafter referred to as the "turbocharged side exhaust gas resistance") during the rich/lean burn control. That is, the opening amounts of both exhaust gas control valves 16A and 16B are controlled such that the opening amount of the naturally-aspirated side exhaust gas control valve 16B is smaller than the opening amount of the turbocharged side exhaust gas control valve 16A, as shown in FIIG 2, for example. As a result, overheating of the three way catalyst 14B in the naturally-aspirated exhaust branch pipe 9B (hereinafter this three way catalyst will be referred to as the "naturally-aspirated side three way catalyst") will be suppressed. That is, when the opening amount of the naturally-aspirated side exhaust control valve 16B is equal to the opening amount of the turbocharged side exhaust gas control valve 16A, for example, the naturally-aspirated side exhaust gas resistance is lower than the turbocharged side exhaust gas resistance. In this case, at least some of the exhaust gas discharged from the turbocharged side cylinder group 2A flows into the naturally-aspirated side exhaust branch pipe 9B via the communicating pipe 17. In this case, both exhaust gas containing a large amount of HC and exhaust gas containing a large amount of oxygen flow into the naturally-aspirated side three way catalyst 14B. The HC and oxygen react in the three way catalyst 14B and generate heat, thus raising the temperature of the three way catalyst 14B which may cause the three way catalyst 14B to overheat. However, by controlling the opening amount of the naturally-aspirated side exhaust gas control valve 16B so that the naturally-aspirated side exhaust gas resistance becomes equal to or close to the turbocharged side exhaust gas resistance during rich/lean burn control, exhaust gas discharged from the turbocharged side cylinder group 2A can be suppressed from flowing into the naturally-aspirated side exhaust branch pipe 9B via the communicating pipe 17. As a result, overheating of the naturally-aspirated side three way catalyst 14B can be suppressed.

Figure 3:
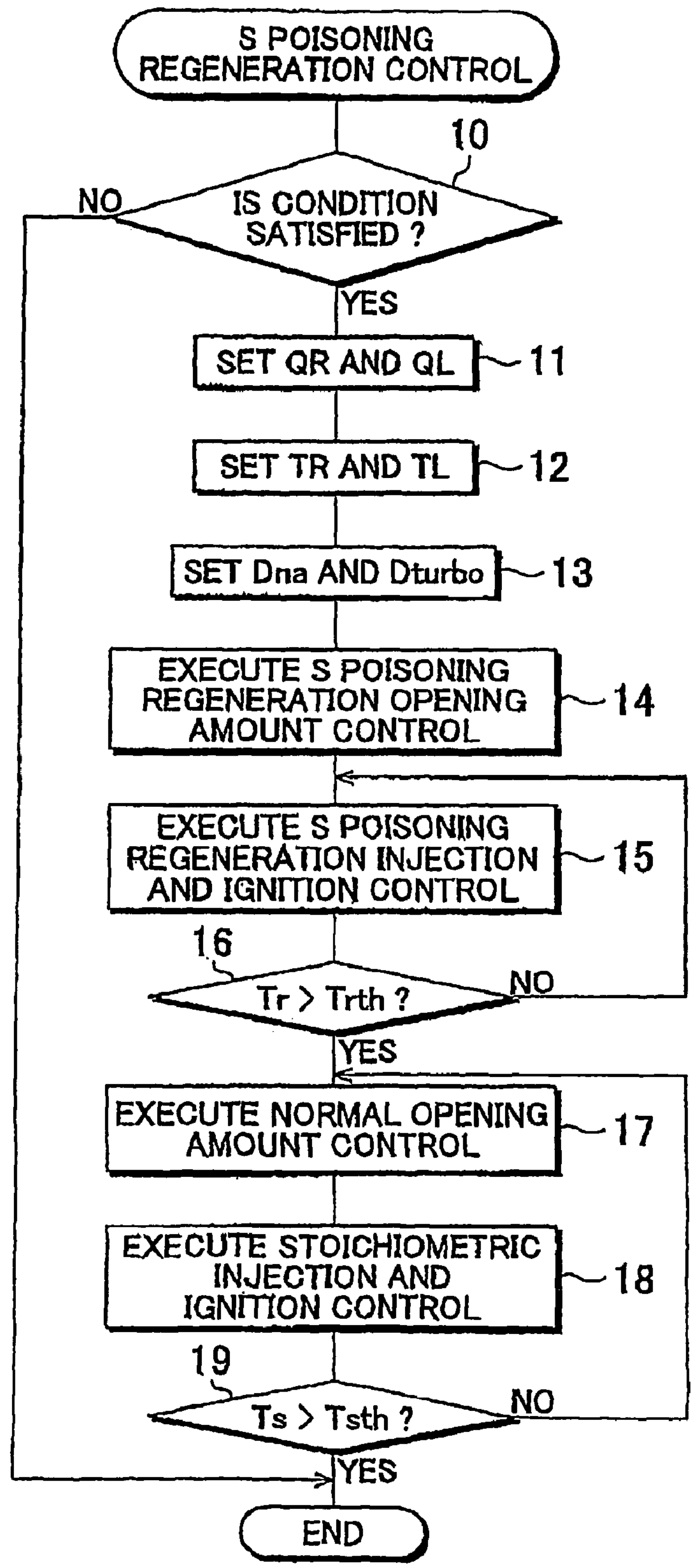
FIG. 3 is a flowchart illustrating one example of a routine for executing S poisoning regeneration control of the exhaust gas control apparatus according to the first example embodiment.

FIG. 3 is a flowchart illustrating one example of a routine for executing S poisoning regeneration control of the exhaust gas control apparatus according to the first example embodiment. The routine shown in FIG. 3 is executed when the amount of SOx retained in the NOx catalyst 15 has reached a predetermined amount. In the routine shown in FIG. 3, first in step 10 it is determined whether a condition for allowing execution of the S poisoning regeneration control (hereinafter this condition will be referred to as "S poisoning regeneration allowing condition") is satisfied. Here, this S poisoning regeneration allowing condition is satisfied when, for example, the vehicle speed is equal to or greater than a predetermined speed, the load of the internal combustion engine (hereinafter referred to as the "engine load") is equal to or greater than a predetermined value, the engine speed is equal to or greater than a predetermined value, and/or the amount of air drawn into the cylinders is equal to or greater than a predetermined amount.

When it is determined in step 10 that the S poisoning regeneration allowing condition is satisfied, fuel injection quantities QR and QL for the cylinder groups 2A and 2B are then set in step 11. That is, the fuel injection quantity QR for the rich burn cylinder group and the fuel injection quantity QL for the lean burn cylinder group are set such that the average air-fuel ratio of the exhaust gas that flows into the NOx catalyst 15 is equal to or richer than the stoichiometric air-fuel ratio. The fuel injection quantities QR and QL in this case are set by being calculated from maps or the like based on the engine speed and the engine load, for example.

Next in step 12, an ignition timing TR of the rich burn cylinder group and the ignition timing TL of the lean burn cylinder group are set. The ignition timings TR and TL in this case are set by being calculated from maps or the like based on the engine speed and the engine load, for example. Next in step 13, an opening amount Dna of the naturally-aspirated side exhaust gas control valve 16B and an opening amount Dturbo of the turbocharged side exhaust gas control valve 16A are set. At this time, the opening amount Dna is at least less than the opening amount Dturbo, and the opening amount Dturbo is set to the maximum opening amount, for example.

Next in step 14, the S poisoning regeneration opening amount control is executed. That is, in step 14, the opening amount of the naturally-aspirated side exhaust gas control valve 16B is controlled to the opening amount Dna that was set in step 13, and the opening amount of the turbocharged side exhaust gas control valve 16A is controlled to the opening amount Dturbo that was also set in step 13. Next in step 15, S poisoning regeneration injection and ignition control is executed. That is, in step 15, fuel of the fuel injection quantity QR that was set in step 11 is injected from the fuel injection valves of the rich burn cylinder group and ignited by spark plugs in the rich burn cylinder group at the ignition timing TR that was set in step 12. Similarly, fuel of the fuel injection quantity QL that was set in step 11 is injected from the fuel injection valves of the lean burn cylinder group and ignited by spark plugs in the lean burn cylinder group at the ignition timing TL that was also set in step 12.

Next in step 16, it is determined whether the period of time that has passed after the S poisoning regeneration allowing condition was satisfied in step 10, i.e., a period of time Tr that has passed since the S poisoning regeneration control essentially started, has exceeded a predetermined period of time Trth (i.e., whether Tr>Trth). The predetermined period of time Trth in this case is set to a period of time sufficient for all or almost all of the SOx to be released from the NOx catalyst 15. If it is determined in step 16 that Tr is greater than Trth, steps 17 and thereafter are executed. If, on the other hand, it is determined in step 16 that Tr is equal to or less than Trth, then step 15 is repeatedly executed until it is determined that Tr is greater than Trth.

In step 17 normal opening amount control is executed. That is, when S poisoning regeneration control is not being performed, i.e., when the internal combustion engine is in a normal operating state, normal opening amount control is performed which controls the opening amounts of the exhaust gas control valves 16A and 16B according to the operating state of the internal combustion engine. It is this normal opening amount control that is executed in step 17.

Next in step 18, stoichiometric injection and ignition control is executed. That is, in step 18, the fuel injection quantity of each cylinder group is controlled so that combustion in which the air-fuel ratio of the air-fuel mixture is the stoichiometric air-fuel ratio (hereinafter this combustion will be referred to as "stoichiometric combustion") is performed in both cylinder groups 2A and 2B. The injected fuel is then ignited by a spark plug at a predetermined ignition timing (such as an ignition timing at which maximum torque is output from the combustion of the fuel) in each of the cylinder groups 2A and 2B. Next in step 19, it is determined whether the period of time that has passed after it was determined in step 16 that Tr is greater than Trth, i.e., a period of time Ts for which steps 17 and 18 are executed, has exceeded a predetermined period of time Tsth (i.e., whether Ts>Tsth). If it is determined here that Ts is greater than Tsth, the routine ends. If, on the other hand, it is determined that Ts is equal to or less than Tsth, then steps 17 and 18 are repeatedly executed until it is determined that Ts is greater than Tsth.

Executing the stoichiometric injection and ignition control in step 18 in this way makes it possible for the NOx catalyst 15 to recover its NOx retaining ability and NOx purifying ability earlier. That is, immediately after step 17 is executed, the NOx catalyst temperature becomes equal to or greater than the SOx release temperature, and is higher than the upper limit value of the temperature range within which the NOx catalyst 15 is able to retain and purify NOx (i.e., the NOx retaining and purifying upper limit temperature). Therefore, in order for the NOx catalyst 15 to be able to retain and purify NOx, the NOx catalyst temperature must be lowered to the NOx retaining and purifying upper limit temperature. When the stoichiometric injection and ignition control is executed in step 18, the temperature of the exhaust gas that flows into the NOx catalyst 15 drops. As a result, the temperature of the NOx catalyst 15 can be quickly reduced to the NOx retaining and purifying upper limit value, which enables the NOx catalyst 15 to quickly recover its NOx retaining ability and NOx purifying ability.

Also, executing the stoichiometric injection and ignition control in step 18 enables NOx that flows out from the NOx catalyst 15 to be reduced. That is, when the S poisoning regeneration control is not being performed, i.e., when the internal combustion engine is in a normal operating state, basically lean combustion is performed in both cylinder groups 2A and 2B. In this case, more NOx is produced inside each cylinder compared to when stoichiometric combustion is performed. On the other hand, as described above, immediately after step 17 is executed, the NOx catalyst temperature becomes equal to or greater than the SOx release temperature and is higher than the NOx retaining and purifying upper limit temperature. Therefore, if the internal combustion engine is in a normal operating state immediately after step 17 is executed, a large amount of NOx will flow into the NOx catalyst 15 despite the fact that the NOx catalyst temperature has not dropped to the NOx retaining and purifying upper limit temperature. As a result, a large amount of NOx will end up flowing out of the NOx catalyst 15. However, if steps 18 and 19 are executed after step 17 is executed, the stoichiometric injection and ignition control is executed for a fixed period of time. Accordingly, less NOx will flow into the NOx catalyst 15 even if the NOx catalyst temperature has not dropped to the NOx retaining and purifying upper limit temperature. Hence the amount of NOx that flows out of the NOx catalyst 15 is less. Of course, by setting the predetermined period of time Tsth used in step 19 to the period of time that it takes for the NOx catalyst temperature to drop to the NOx retaining temperature, then even if the routine in FIG. 3 ends and the engine switches back to operating in the normal state and lean combustion is performed in both of the cylinder groups 2A and 2B, no or almost no NOx will flow out from the NOx catalyst because the NOx catalyst temperature has dropped to the NOx retaining and purifying upper limit temperature.

Figure 4:
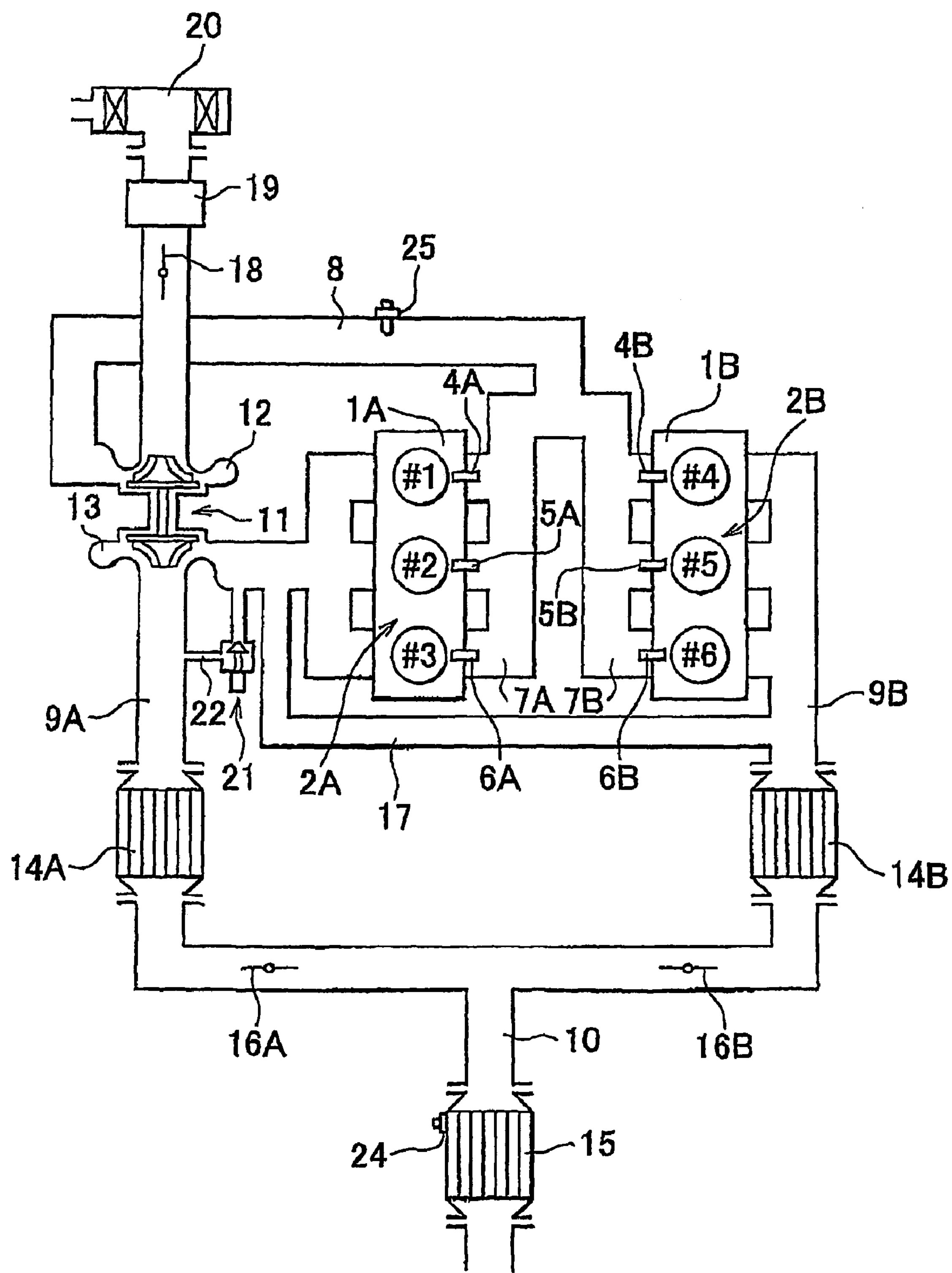
FIG. 4 is a block diagram schematically showing the structure of an internal combustion engine to which an exhaust gas control apparatus according to a second example embodiment of the invention can be applied.
Figure 5:
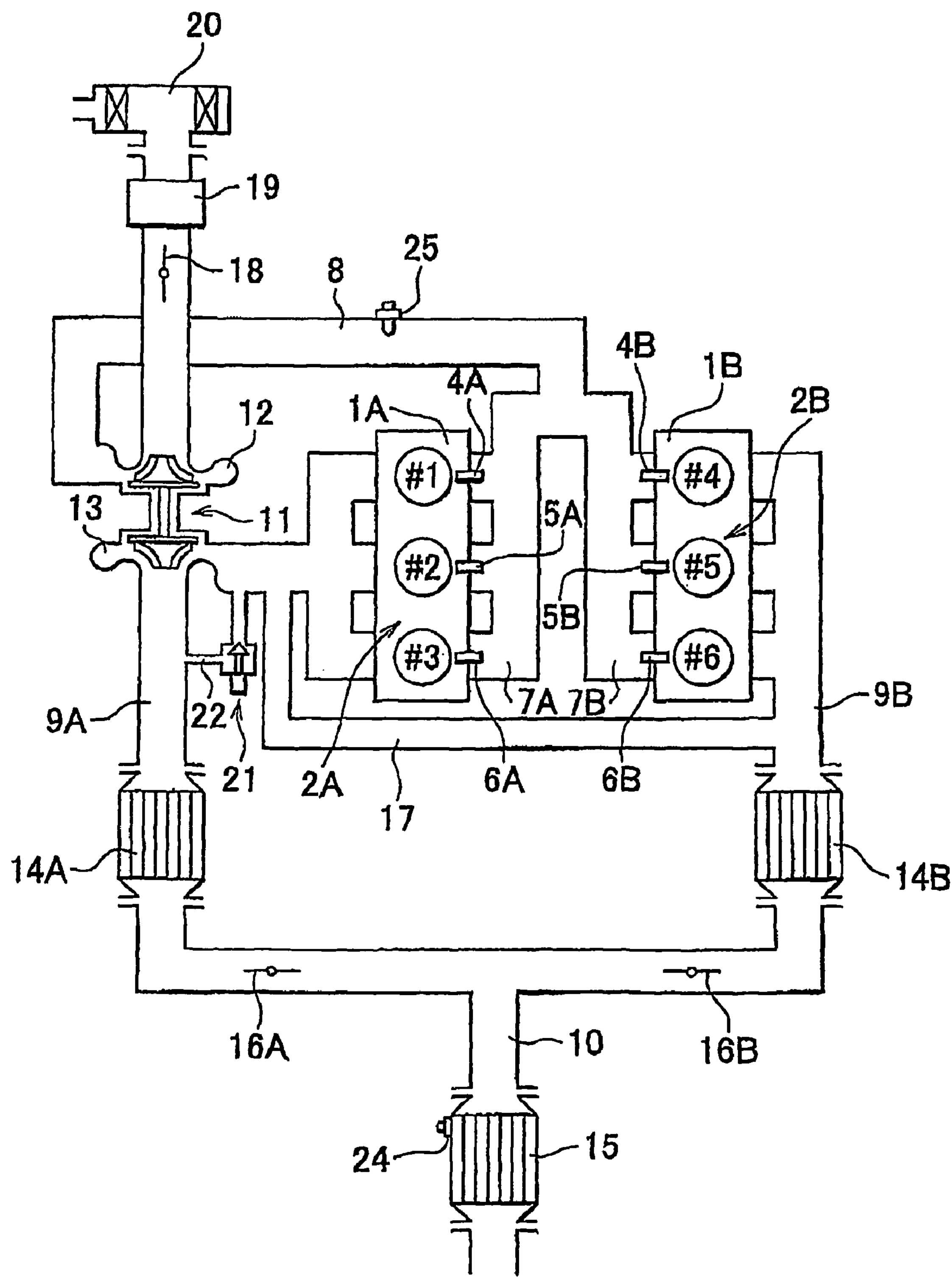
FIG. 5 is a block diagram similar to FIG. 4, which shows the exhaust gas control apparatus when S poisoning regeneration control is being executed.

Next, the S poisoning regeneration control of an exhaust gas control apparatus according to a second example embodiment of the invention will be described. FIG. 4 shows an internal combustion engine to which S poisoning regeneration control of the exhaust gas control apparatus according to the second example embodiment can be applied. In this internal combustion engine, the turbocharger 11 is provided with a wastegate valve 21 arranged in a bypass passage 22 that connects the exhaust branch pipe 9A upstream of the exhaust gas turbine 13 with the exhaust branch pipe 9A downstream of the exhaust gas turbine 13 but upstream of the three way catalyst 14A. As shown in FIG. 4, when the wastegate valve 21 is fully closed, exhaust gas is prevented from flowing through the bypass passage 22. On the other hand, when the wastegate valve 21 is open, as shown in FIG. 5, exhaust gas flows through the bypass passage 22 from the exhaust branch pipe 9A upstream of the exhaust gas turbine 13 to the exhaust branch pipe 9A downstream of the exhaust gas turbine 13. The rest of the structure of the internal combustion engine shown in FIGS. 4 and 5 is the same as that shown in FIG. 1 so a description thereof will be omitted.

In the S poisoning regeneration control of the exhaust gas control apparatus of the second example embodiment, control similar to the rich/lean burn control of the exhaust gas control apparatus according to the first example embodiment is performed, with rich combustion being performed in one of the cylinder groups while lean combustion is performed in the other cylinder group. Further, in the S poisoning regeneration control of the exhaust gas control apparatus according to the second example embodiment, the opening amount of the wastegate valve is increased, preferably to fully open, so that the naturally-aspirated side exhaust gas resistance is equal to or at least close to the turbocharged side exhaust gas resistance during the rich/lean burn control. Accordingly, less exhaust gas, of the exhaust gas that is discharged from the turbocharged side cylinder group 2A, flows into the naturally-aspirated side exhaust branch pipe 9B via the communicating pipe 17, thereby suppressing the naturally-aspirated side three way catalyst 14B from overheating for the same reasons given in the first example embodiment.

In the S poisoning regeneration control of the exhaust gas control apparatus according to the second example embodiment, if the naturally-aspirated side exhaust gas resistance does not become equal to the turbocharged side exhaust gas resistance even if the wastegate valve 21 is fully open, the naturally-aspirated side exhaust gas resistance may be made equal to or closer to the turbocharged side exhaust gas resistance by controlling the opening amount of the naturally-aspirated side exhaust gas control valve 16B.

Figure 6:
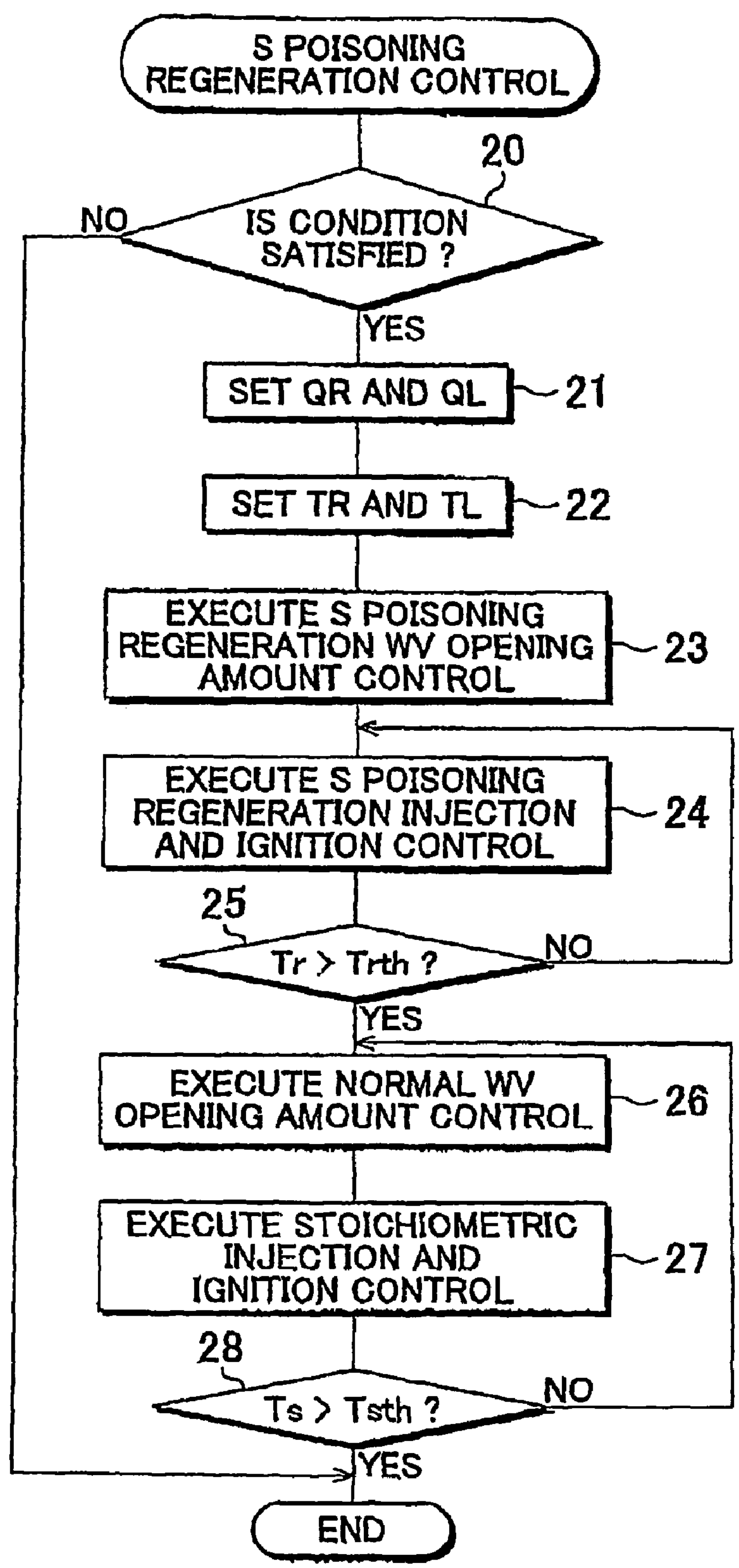
FIG. 6 is a flowchart illustrating one example of a routine for executing S poisoning regeneration control of the exhaust gas control apparatus according to the second example embodiment.

FIG. 6 is a flowchart illustrating one example of a routine for executing the S poisoning regeneration control of the exhaust gas control apparatus according to the second example embodiment. The routine shown in FIG. 6 is executed when the amount of SOx retained in the NOx catalyst 15 has reached a predetermined amount. In the routine in FIG. 6, first in step 20 it is determined whether an S poisoning regeneration allowing condition (this is the same as the S poisoning regeneration condition described in connection with the routine shown in FIG. 3) is satisfied.

When it has been determined in step 20 that the S poisoning regeneration allowing condition is satisfied, then the fuel injection quantities QR and QL for the cylinder groups 2A and 2B are set in step 21. That is, the fuel injection quantity QR for the rich burn cylinder group and the fuel injection quantity QL for the lean burn cylinder group are set such that the average air-fuel ratio of the exhaust gas that flows into the NOx catalyst 15 is equal to or richer than the stoichiometric air-fuel ratio. The fuel injection quantities QR and QL in this case are set by being calculated from maps or the like based on the engine speed and the engine load, for example.

Next in step 22, an ignition timing TR of the rich burn cylinder group and the ignition timing TL of the lean burn cylinder group are set. The ignition timings TR and TL in this case are set by being calculated from maps or the like based on the engine speed and the engine load, for example. Next in step 23, S poisoning regeneration opening amount control is executed. That is, in step 23, the wastegate valve 21 is fully opened in an operating region where turbocharging is not necessary. Then in step 24, S poisoning regeneration injection and ignition control is executed. That is, in step 24, fuel of the fuel injection quantity QR that was set in step 21 is injected from the fuel injection valves of the rich burn cylinder group and ignited by spark plugs in the rich burn cylinder group at the ignition timing TR that was set in step 22. Similarly, fuel of the fuel injection quantity QL that was set in step 21 is injected from the fuel injection valves of the lean burn cylinder group and ignited by spark plugs in the lean burn cylinder group at the ignition timing TL that was also set in step 22.

Next in step 25, it is determined whether the period of time that has passed after the S poisoning regeneration allowing condition was satisfied in step 20, i.e., a period of time Tr that has passed since the S poisoning regeneration control essentially started, has exceeded a predetermined period of time Trth (i.e., whether Tr>Trth). The predetermined period of time Trth in this case is the same as the predetermined period of time Trth in step 16 in the routine in FIG. 3. If it is determined in step 25 that Tr is greater than Trth, steps 26 and thereafter are executed. If, on the other hand, it is determined in step 25 that Tr is equal to or less than Trth, then step 24 is repeatedly executed until it is determined that Tr is greater than Trth. Incidentally, the determination in step 25 is made based on the period of time that has passed. Alternatively, however, the catalyst temperature may be measured or estimated and step 24 may be repeatedly executed until that temperature exceeds a predetermined value.

In step 26, normal wastegate valve opening amount control is executed. That is, when S poisoning regeneration control is not being performed, i.e., when the internal combustion engine is in a normal operating state, normal wastegate valve opening amount control is performed which controls the opening amount of the wastegate valve 21 according to the operating state of the internal combustion engine. It is this normal wastegate valve opening amount control that is executed in step 26.

Next in step 27, stoichiometric injection and ignition control is executed (this is the same stoichiometric injection and ignition control as that which is executed in step 18 in the routine in FIG. 3). That is, it is determined whether the period of time that has passed after it was determined in step 25 that Tr is greater than Trth, i.e., a period of time Ts for which steps 26 and 27 are executed, has exceeded a predetermined period of time Tsth (i.e., whether Ts>Tsth). Here, the predetermined period of time Tsth is the same as the predetermined period of time Tsth in step 19 in the routine in FIG. 3. If it is determined in step 28 that Ts is greater than Tsth, the routine ends. If, on the other hand, it is determined that Ts is equal to or less than Tsth, then steps 26 and 27 are repeatedly executed until it is determined that Ts is greater than Tsth.

Figure 7:
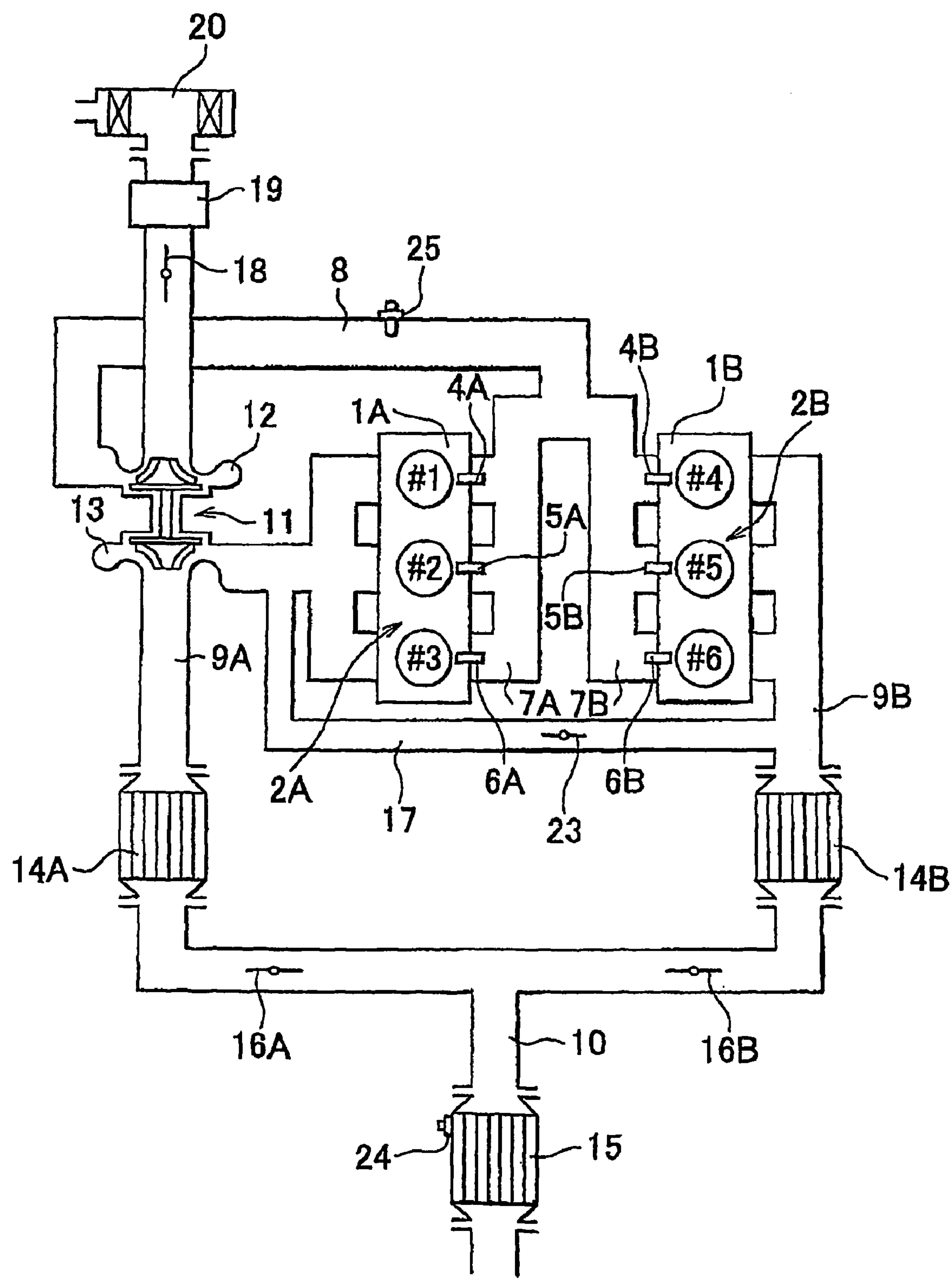
FIG. 7 is a block diagram schematically showing the structure of an internal combustion engine to which an exhaust gas control apparatus according to a third example embodiment of the invention can be applied.
Figure 8:
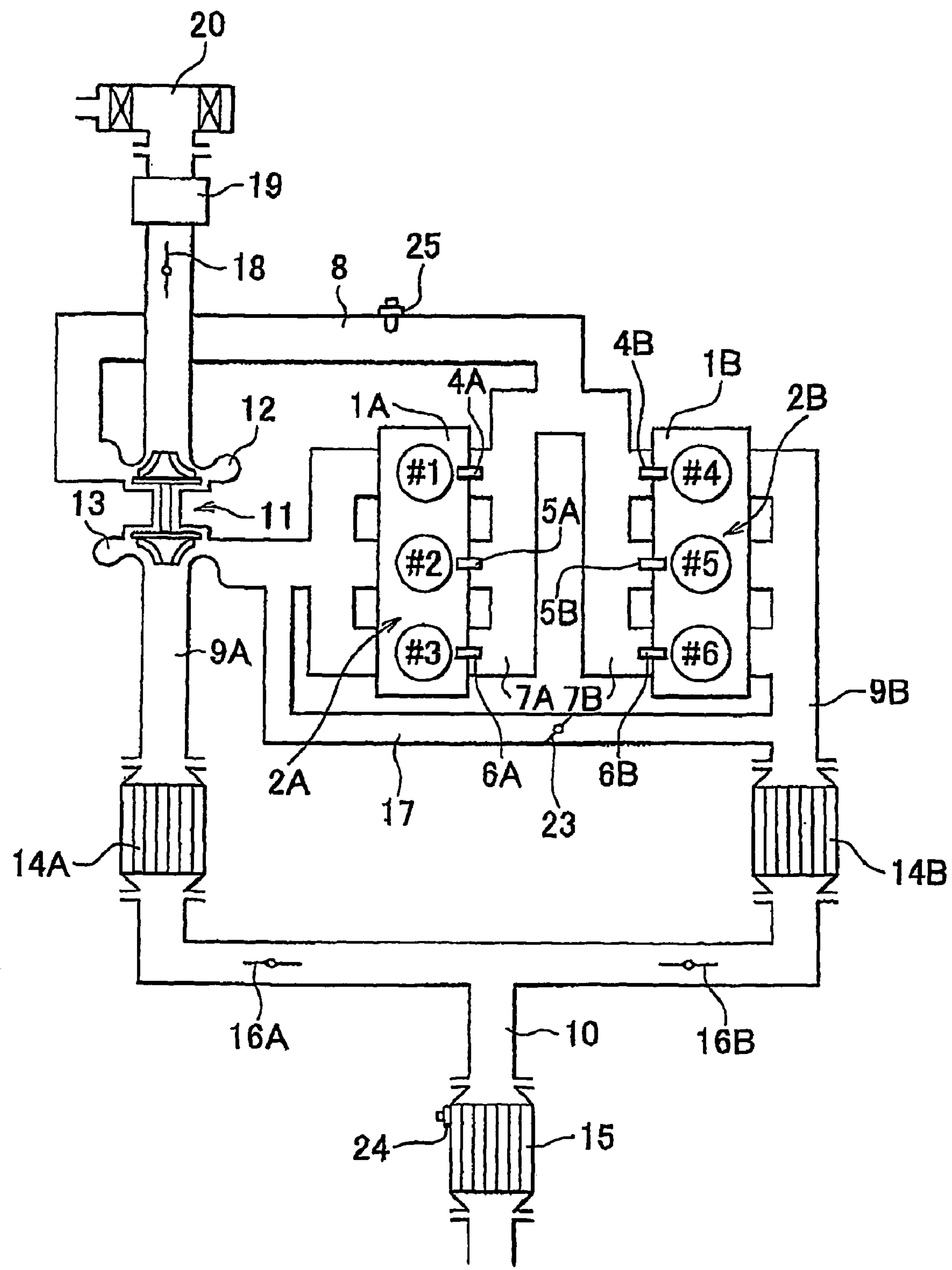
FIG. 8 is a is a block diagram similar to FIG. 7 but which shows the exhaust gas control apparatus when S poisoning regeneration control is being executed.

Next, S poisoning regeneration control of an exhaust gas control apparatus according to a third example embodiment will be described. FIG. 7 is a block diagram schematically showing the structure of an internal combustion engine to which the exhaust gas control apparatus according to the third example embodiment of the invention can be applied. In this internal combustion engine, a communication control valve 23 is arranged in the communicating pipe 17. As shown in FIG. 7, when the communication control valve 23 is open, exhaust gas is able to flow through the communicating pipe 17. On the other hand, when the communication control valve 23 is fully closed, as shown in FIG. 8, exhaust gas is unable to flow through the communicating pipe 17. The structure of the internal combustion engine shown in FIGS. 7 and 8 is the same as that shown in FIG. 1.

In the S poisoning regeneration control of the exhaust gas control apparatus according to the third example embodiment, control similar to the rich/lean burn control of the exhaust gas control apparatus according to the first example embodiment is performed, with rich burn being performed in one of the cylinder groups and lean burn being performed in the other cylinder group. Furthermore, in the S poisoning regeneration control of the exhaust gas control apparatus in the third example embodiment, the communication control valve 23 is fully closed, as shown in FIG. 8, during the rich/lean burn control. As a result, exhaust gas discharged from the turbocharged side cylinder group 2A will not flow into the naturally-aspirated side exhaust branch pipe 9B via the communicating pipe 17, which suppresses the naturally-aspirated side three way catalyst 14B from overheating for the same reasons given in the first example embodiment.

Figure 9:
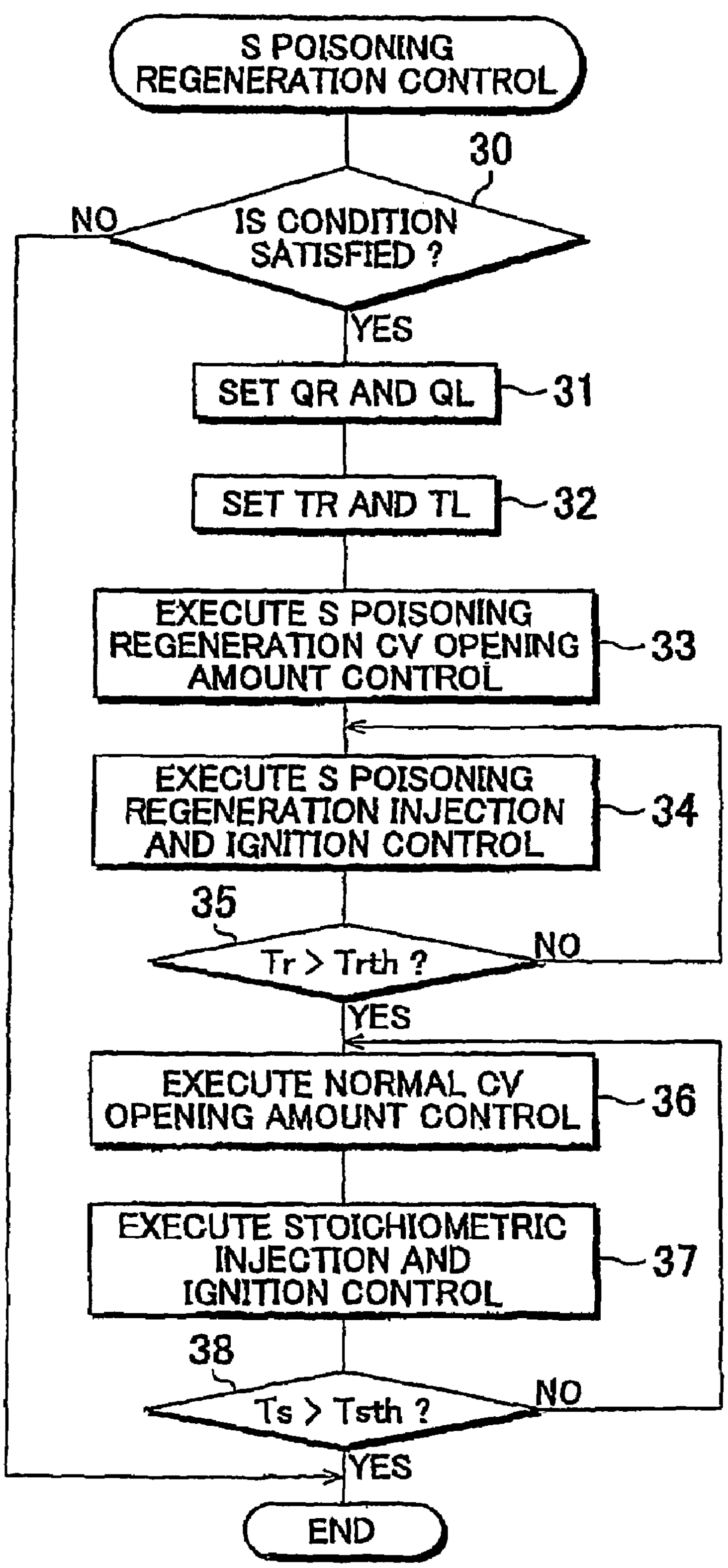
FIG. 9 is a flowchart illustrating one example of a routine for executing S poisoning regeneration control of the exhaust gas control apparatus according to the third example embodiment.

FIG. 9 is a flowchart illustrating one example of a routine for executing S poisoning regeneration control of the exhaust gas control apparatus according to the third example embodiment. The routine shown in FIG. 9 is executed when the amount of SOx retained in the NOx catalyst 15 has reached a predetermined amount. In the routine shown in FIG. 9, first in step 30 it is determined whether an S poisoning regeneration allowing condition (which is the same as the S poisoning regeneration allowing condition described in connection with the routine shown in FIG. 3) is satisfied.

When it is determined in step 30 that the S poisoning regeneration allowing condition is satisfied, fuel injection quantities QR and QL for the cylinder groups 2A and 2B are then set in step 31. That is, the fuel injection quantity QR for the rich burn cylinder group and the fuel injection quantity QL for the lean burn cylinder group are set such that the average air-fuel ratio of the exhaust gas that flows into the NOx catalyst 15 is equal to or richer than the stoichiometric air-fuel ratio. The fuel injection quantities QR and QL in this case are set by being calculated from maps or the like based on the engine speed and the engine load, for example.

Next in step 32, an ignition timing TR of the rich burn cylinder group and an ignition timing TL of the lean burn cylinder group are set. The ignition timings TR and TL in this case are set by being calculated from maps or the like based on the engine speed and the engine load, for example. Next in step 33, S poisoning regeneration CV opening amount control is executed. That is, the communicating control valve 23 is fully closed in step 33. Then in step 34, fuel of the fuel injection quantity QR that was set in step 31 is injected from the fuel injection valves of the rich burn cylinder group and ignited by spark plugs in the rich burn cylinder group at the ignition timing TR that was set in step 32. Similarly, fuel of the fuel injection quantity. QL that was set in step 31 is injected from the fuel injection valves of the lean burn cylinder group and ignited by spark plugs in the lean burn cylinder group at the ignition timing TL that was also set in step 32.

Next in step 35, it is determined whether the period of time that has passed after the S poisoning regeneration allowing condition was satisfied in step 30, i.e., a period of time Tr that has passed since the S poisoning regeneration control essentially started, has exceeded a predetermined period of time Trth (i.e., whether Tr>Trth). The predetermined period of time Trth in this case is the same as the predetermined period of time Trth in step 16 in the routine in FIG. 3. If it is determined in step 35 that Tr is greater than Trth, steps 36 and thereafter are executed. If, on the other hand, it is determined in step 35 that Tr is equal to or less than Trth, then step 34 is repeatedly executed until it is determined that Tr is greater than Trth.

In step 36, normal CV opening amount control is executed. That is, when S poisoning regeneration control is not being performed, i.e., when the internal combustion engine is in a normal operating state, normal CV opening amount control is performed which controls the opening amount of the communication control valve 23 according to the operating state of the internal combustion engine. It is this normal CV opening amount control that is executed in step 36.

Next in step 37, stoichiometric injection and ignition control is executed (this is the same stoichiometric injection and ignition control as that which is executed in step 18 in the routine in FIG. 3). Then in step 38, it is determined whether the period of time that has passed after it was determined in step 35 that Tr is greater than Trth, i.e., a period of time Ts for which steps 36 and 37 are executed, has exceeded a predetermined period of time Tsth (i.e., whether Ts>Tsth). Here, the predetermined period of time Tsth is the same as the predetermined period of time Tsth in step 19 in the routine in FIG. 3. If it is determined in step 38 that Ts is greater than Tsth, the routine ends. If, on the other hand, it is determined that Ts is equal to or less than Tsth, then steps 36 and 37 are repeatedly executed until it is determined that Ts is greater than Tsth.

Next, S poisoning regeneration control of an exhaust gas control apparatus according to a fourth example embodiment of the invention will be described. The internal combustion engine to which the S poisoning regeneration control of the exhaust gas control apparatus according to the fourth example embodiment can be applied is the same as the internal combustion engine shown in FIG. 1. In the S poisoning regeneration control of the exhaust gas control apparatus according to the fourth example embodiment, when it is determined that the S poisoning regeneration control should be executed, the NOx catalyst temperature is first raised before performing the rich/lean burn control and the S poisoning regeneration opening amount control of the exhaust gas control apparatus according to the first example embodiment. That is, pre S poisoning regeneration opening amount control is performed which controls the opening amounts of the exhaust gas control valves 16A and 16B such that as much of the exhaust gas that was discharged from the turbocharged side cylinder group 2A as possible flows into the NOx catalyst 15 via the communicating pipe 17 and the naturally-aspirated side exhaust branch pipe 9B, and more preferably, such that all of the exhaust gas that was discharged from the turbocharged side cylinder group 2A flows into the NOx catalyst 15 via the communicating pipe 17 and the naturally-aspirated side exhaust branch pipe 9B. That is, at least the opening amount of the turbocharged side exhaust gas control valve 16A is decreased, or the opening amount of the naturally-aspirated side exhaust gas control valve 16B is increased, or the opening amount of the turbocharged side exhaust gas control valve 16A is decreased while the opening amount of the naturally-aspirated side exhaust gas control valve 16B is increased, and more preferably, the turbocharged side exhaust gas control valve 16A is fully closed (of course, when the turbocharged side exhaust gas control valve 16A is fully closed, the naturally-aspirated side exhaust gas control valve 16B may be fully opened). Accordingly, the amount of exhaust gas that passes through the large heat capacity exhaust turbine decreases, and as a result, the amount of exhaust gas heat carried to the NOx catalyst 15 increases, which raises the NOx catalyst temperature.

Then, when the NOx catalyst temperature has reached the SOx release temperature, control similar to the rich/lean burn control of the exhaust gas control apparatus according to the first example embodiment, as well as control similar to the S poisoning regeneration opening amount control of the exhaust gas control apparatus according to the first example embodiment are performed. Alternatively, even if the NOx catalyst temperature has not reached the SOx release temperature, control similar to the rich/lean burn control of the exhaust gas control apparatus according to the first example embodiment, as well as control similar to the S poisoning regeneration opening amount control of the exhaust gas control apparatus according to the first example embodiment are also performed when the highest possible NOx catalyst temperature for the operating state of the internal combustion engine (particularly the engine speed and engine load) at that time is reached. That is, when the internal combustion engine is operating under a light load at low speed, for example, the NOx catalyst temperature may not be able to rise to the SOx release temperature even if the amount of exhaust gas that was discharged from the turbocharged side cylinder group 2A which flows into the NOx catalyst 15 via the communicating pipe 17 and the naturally-aspirated side exhaust branch pipe 9B is increased. In this case, if the rich/lean burn control and the S poisoning regeneration opening amount control are not executed until the NOx catalyst temperature reaches the SOx release temperature, substantive S poisoning regeneration control will not be executed for an extended period of time. Therefore, in the fourth example embodiment, even if the NOx catalyst temperature has not reached the SOx release temperature, the rich/lean burn control and the S poisoning regeneration opening amount control are performed as long as the highest possible NOx catalyst temperature for the operating state of the internal combustion engine at that time has been reached.

During execution of the foregoing pre S poisoning regeneration opening amount control, combustion in which the air-fuel ratio of the air-fuel mixture is made the stoichiometric air-fuel ratio (i.e., stoichiometric combustion) is performed in both cylinder groups 2A and 2B or at least in the naturally-aspirated side cylinder group 2B.

Figure 10:
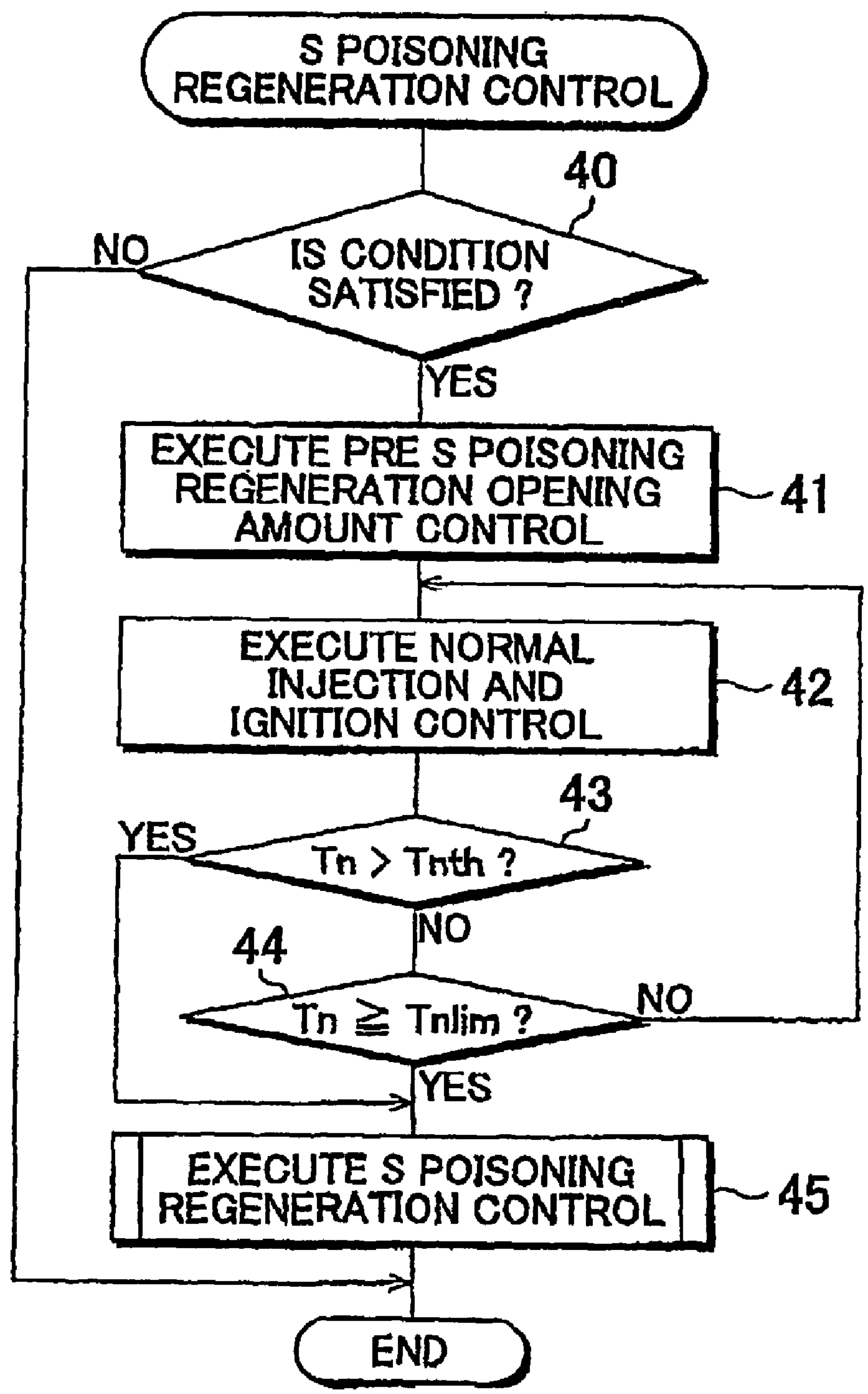
FIG. 10 is a flowchart illustrating one example of a routine for executing S poisoning regeneration control of an exhaust gas control apparatus according to a fourth example embodiment of the invention.

FIG. 10 is a flowchart illustrating one example of a routine for executing S poisoning regeneration control of the exhaust gas control apparatus according to the fourth example embodiment. The routine shown in FIG. 10 is executed when the amount of SOx retained in the NOx catalyst 15 has reached a predetermined amount. In the routine shown in FIG. 10, first in step 40 it is determined whether an S poisoning regeneration allowing condition (this is the same as the S poisoning regeneration condition described in connection with the routine shown in FIG. 3) is satisfied.

When it has been determined in step 40 that the S poisoning regeneration allowing condition is satisfied, then the pre S poisoning regeneration opening amount control is executed in step 41. That is, in step 41 the turbocharged side exhaust gas control valve 16A is fully closed while the naturally-aspirated side exhaust gas control valve 16B is fully opened. Next in step 42, normal injection and ignition control is executed. That is, fuel is injected from the fuel injectors 4A, 5A, 6A, 4B, 5B, and 6B and then ignited by spark plugs, just as when the S poisoning regeneration control is not being performed, i.e., just as when the internal combustion engine is in the normal operating state.

Next in step 43, it is determined whether a NOx catalyst temperature Tn has exceeded a SOx release temperature Tnth (i.e., whether $Tn>Tnth$). When it is determined that Tn is greater than Tnth, step 45 is executed. If, on the other hand, it is determined that Tn is equal to or less than Tnth, step 44 is executed where it is determined whether the NOx catalyst temperature Tn has reached the highest possible NOx catalyst temperature Tnlim for the operating state of the internal combustion engine at that time (i.e., whether $Tn \geqq Tnlim$). If it is determined that Tn is equal to or greater than Tnlim, step 45 is executed. If, on the other hand, it is determined that Tn is less than Tnlim, steps 42 and 43 are repeated.

In step 45, the control in steps 11 to 19 in the routine shown in FIG. 3 is executed.

Next S poisoning regeneration control of an exhaust gas control apparatus according to a fifth example embodiment of the invention will be described. The internal combustion engine to which the S poisoning regeneration control of the exhaust gas control apparatus according to the fifth example embodiment can be applied is the same as the internal combustion engine shown in FIG. 4. In the S poisoning regeneration control of the exhaust gas control apparatus according to the fifth example embodiment, when it is determined that the S poisoning regeneration control should be executed, the NOx catalyst temperature is first raised before performing the rich/lean burn control and the S poisoning regeneration opening amount control of the exhaust gas control apparatus according to the first example embodiment. That is, in the internal combustion engine to which the exhaust gas control apparatus according to the fifth example embodiment can be applied, lean burn is performed in each cylinder in the majority of operating states. When it is determined that the S poisoning regeneration control should be executed, combustion in which the air-fuel ratio of the air-fuel mixture is made the stoichiometric air-fuel ratio is performed in both cylinder groups 2A and 2B. As a result, the amount of NOx in the exhaust gas discharged from the cylinder groups 2A and 2B decreases.

Together with this, it is determined whether there is a demand for the internal combustion engine to be in a state in which air that has been turbocharged by the turbocharger 11 is supplied to the cylinders (hereinafter this state will be referred to as "turbocharged state"). If there is no demand for the internal combustion engine to be in this turbocharged state, i.e., if it is determined that there is a demand for the internal combustion engine to be in a state in which air is supplied to the cylinders through natural aspiration (hereinafter this state will be referred to as "naturally-aspirated state"), not in the turbocharged state, then the turbocharged side exhaust gas control valve 16A is fully closed and the naturally-aspirated side exhaust gas control valve 16B is opened (preferably fully). Accordingly, all of the exhaust gas discharged from the cylinder group 2A and 2B will flow into the NOx catalyst 15 via the naturally-aspirated side exhaust branch pipe 9B. That is, none of the exhaust gas that flows into the NOx catalyst 15 will flow in through the exhaust turbine 13 of the large heat capacity turbocharger 11. Therefore, the temperature of the exhaust gas that flows into the NOx catalyst 15 is relatively high so the NOx catalyst temperature can be raised quickly. Of course, no exhaust gas flows through the exhaust turbine 13 at this time so the naturally-aspirated state required of the internal combustion engine is also achieved.

Then when the NOx catalyst temperature has reached the SOx release temperature, both the rich/lean burn control and the S poisoning regeneration opening amount control are performed. Also, when it is determined that there is a demand for the internal combustion engine to be in the turbocharged state, at least the turbocharged side exhaust gas control valve 16A is opened and the wastegate valve 21 is fully closed.

Figure 11:
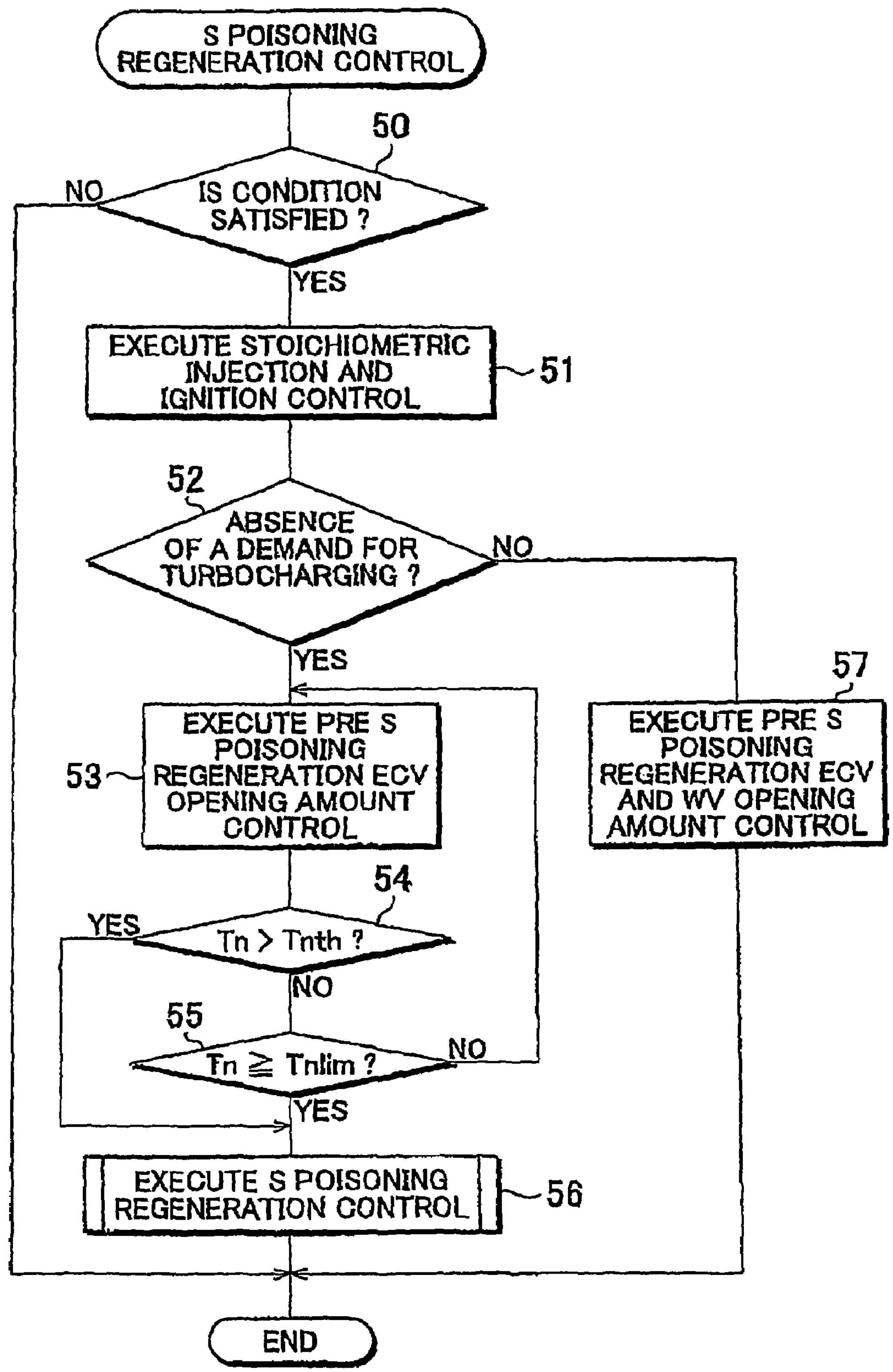
FIG. 11 is a flowchart illustrating one example of a routine for executing S poisoning regeneration control of an exhaust gas control apparatus according to a fifth example embodiment of the invention.

FIG. 11 is a flowchart illustrating one example of a routine for executing S poisoning regeneration control of the exhaust gas control apparatus according to the fifth example embodiment. The routine shown in FIG. 11 is executed when the amount of SOx retained in the NOx catalyst 15 has reached a predetermined amount. In the routine shown in FIG. 11, first in step 50 it is determined whether an S poisoning regeneration allowing condition (this is the same as the S poisoning regeneration condition described in connection with the routine shown in FIG. 3) is satisfied.

When it has been determined in step 50 that the S poisoning regeneration allowing condition is satisfied, then the stoichiometric injection and ignition control is executed in step 51. That is, in step 51 the fuel injection quantities for the cylinder groups 2A and 2B are controlled so that stoichiometric combustion is performed in both of the cylinder groups 2A and 2B. The injected fuel is then ignited by spark plugs at a predetermined ignition timing (such as an ignition timing at which maximum torque is output from the combustion of the fuel) in each of the cylinder groups 2A and 2B.

Next in step 52, it is determined whether there is an absence of a demand for the internal combustion engine to be in the turbocharged state. If it is determined that there is no demand for the internal combustion engine to be in the turbocharged state, pre S poisoning regeneration ECV opening amount control is then executed in step 53. That is, in step 53 the turbocharged side exhaust gas control valve 16A is fully closed and the naturally-aspirated side exhaust gas-control valve 16B is fully opened. Next in step 54, it is determined whether the NOx catalyst temperature Tn has exceeded the SOx release temperature Tnth (i.e., whether Tn>Tnth). If it is determined that Tn is greater than Tnth, then step 56 is executed. If, on the other hand, it is determined that Tn is less than or equal to Tnth, then step 55 is executed, in which case it is determined whether the NOx catalyst temperature Tn has reached the highest possible NOx catalyst temperature Tnlim for the operating state of the internal combustion engine at that time (i.e., whether Tn≧Tnlim). If it is determined that Tn is equal to or greater than Tnlim, step 56 is executed. If, on the other hand, it is determined that Tn is less than Tnlim, steps 53 and 54 are repeated. In step 56, the control of steps 11 to 19 in the routine shown in FIG. 3 is executed.

On the other hand, if it is determined in step 52 that there is a demand for the internal combustion engine to be in the turbocharged state, the process proceeds on to step 57 where pre S poisoning regeneration ECV and wastegate control valve opening amount control is executed. That is, in step 57, the turbocharged side exhaust gas control valve 16A is fully opened, the wastegate valve 21 is fully closed as is the naturally-aspirated side exhaust gas control valve 16B. As a result, all of the exhaust gas that is discharged from the cylinder groups 2A and 2B passes through the exhaust turbine 13 so the turbocharged state demanded of the internal combustion engine is achieved.

Next, S poisoning regeneration control of an exhaust gas control apparatus according to a sixth example embodiment of the invention will be described. The internal combustion engine to which the S poisoning regeneration control of the exhaust gas control apparatus according to the sixth example embodiment can be applied is the same as the internal combustion engine shown in FIG. 4. In the S poisoning regeneration control of the exhaust gas control apparatus according to the sixth example embodiment, when it is determined that the S poisoning regeneration control should be executed, controls similar to the rich/lean burn control and the S poisoning regeneration opening amount control of the exhaust gas control apparatus according to the first example embodiment are performed. When the amount of SOx retained in the NOx catalyst 15 has decreased to a predetermined amount (preferably zero), the rich/lean burn control and the S poisoning regeneration opening amount control end and the following control is performed.

That is, the opening amount of the turbocharged side exhaust gas control valve 16A is increased (preferably to fully open) and the opening amount of the naturally-aspirated side exhaust gas control valve 16B is reduced (preferably to fully closed) so that the percentage of the exhaust gas that passes through the turbocharger 11, of the exhaust gas that flows into the NOx catalyst 15, is as large as possible. Accordingly, the percentage of the exhaust gas that passes through the turbocharger 11, of the exhaust gas that flows into the NOx catalyst 15, increases. In this case, the temperature of the exhaust gas that flows into the NOx catalyst 15 through the turbocharger 11 is lower than the temperature of the exhaust gas that flows into the NOx catalyst via the communicating pipe 17. Therefore, the temperature of the exhaust gas that flows into the NOx catalyst 15 is that much lower so the NOx catalyst temperature reaches the NOx retaining and purifying upper limit temperature earlier.

Also, when there is no demand for the internal combustion engine to be in the turbocharged state, i.e., when there is a demand for the internal combustion engine to be in the naturally-aspirated state, the opening amount of the wastegate valve 21 is increased (preferably to fully open), the opening amount of the turbocharged side exhaust gas control valve 16A is increased (preferably to fully open), and the opening amount of the naturally-aspirated side exhaust gas control valve 16B is reduced (preferably to fully closed). Accordingly, at least some of the exhaust gas passes through the bypass passage 22 of the turbocharger 11. In this case, the temperature of the exhaust gas that flows into the NOx catalyst 15 through the bypass passage 22 is lower than the temperature of the exhaust gas that flows into the NOx catalyst via the communicating pipe 17. Therefore, the temperature of the exhaust gas that flows into the NOx catalyst 15 is that much lower so the NOx catalyst temperature reaches the NOx retaining and purifying upper limit temperature earlier. At this time the wastegate valve 21 is open so no (or an extremely small amount of) exhaust gas flows through the exhaust turbine 13 so it can be said that the naturally-aspirated state demanded of the internal combustion engine is achieved.

If, on the other hand, it is determined that there is a demand for the internal combustion engine to be in the turbocharged state, the opening amount of the turbocharged side exhaust gas control valve 16A is increased (preferably to fully open), the opening amount of the wastegate valve 21 is reduced (preferably to fully closed from the viewpoint of lowering the temperature of the exhaust gas that flows into the NOx catalyst 15 as much as possible), and the opening amount of the naturally-aspirated side exhaust gas control valve 16B is reduced (preferably to fully closed from the viewpoint of lowering the temperature of the exhaust gas that flows into the NOx catalyst 15 as much as possible). Accordingly, a large amount of the exhaust gas flows through the exhaust turbine 13 of the turbocharger 11. Here, the temperature of the exhaust gas that flows into the NOx catalyst 15 through the exhaust turbine 13 is much lower than the temperature of the exhaust gas that flows into the NOx catalyst 15 through the bypass passage 22 and the communicating passage 17. Therefore, the temperature of the exhaust gas that flows into the NOx catalyst 15 is that much lower so the NOx catalyst temperature reaches the NOx retaining and purifying upper limit temperature earlier. At this time most of the exhaust gas passes through the exhaust turbine 13 so it can be said that the turbocharged state demanded of the internal combustion engine is achieved.

Figure 12:
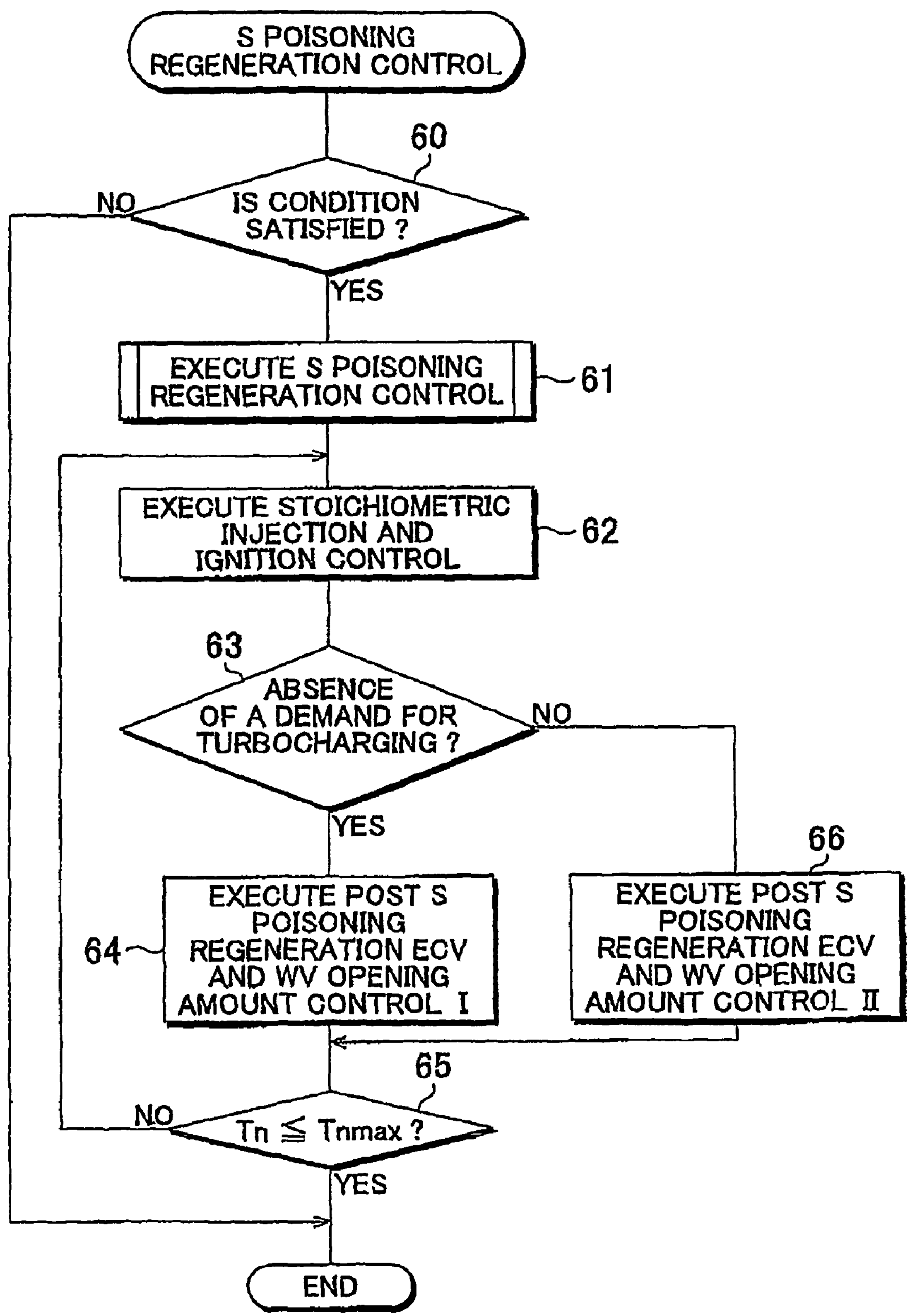
FIG. 12 is a flowchart illustrating one example of a routine for executing S poisoning regeneration control of an exhaust gas control apparatus according to a sixth example embodiment of the invention.

FIG. 12 is a flowchart illustrating one example of a routine for executing the S poisoning regeneration control of the exhaust gas control apparatus according to the sixth example embodiment. The routine shown in FIG. 12 is executed when the amount of SOx retained in the NOx catalyst 15 has reached a predetermined amount. In the routine shown in FIG. 12, first in step 60 it is determined whether an S poisoning regeneration allowing condition (this is the same as the S poisoning regeneration condition described in connection with the routine shown in FIG. 3) is satisfied.

When it has been determined in step 60 that the S poisoning regeneration allowing condition is satisfied, then the S poisoning regeneration control is executed in step 61. In the S poisoning regeneration control in this case, steps 11 to 19 in FIG. 3 are performed. Next in step 62, stoichiometric injection and ignition control is executed. That is, in step 62 the fuel injection quantities for the cylinder groups 2A and 2B are controlled so that stoichiometric combustion is performed in both of the cylinder groups 2A and 2B. The injected fuel is then ignited by spark plugs at a predetermined ignition timing (such as an ignition timing at which maximum torque is output from the combustion of the fuel) in each of the cylinder groups 2A and 2B.

Next in step 63, it is determined whether there is an absence of a demand for the internal combustion engine to be in the turbocharged state. If it is determined that there is no demand for the internal combustion engine to be in the turbocharged state, the process proceeds on to step 64 where post S poisoning regeneration ECV and wastegate valve opening amount control I is executed. That is, in step 64, the turbocharged side exhaust gas control valve 16A and the wastegate valve 21 are both fully opened while the naturally-aspirated side exhaust gas control valve 16B is kept fully closed. If, on the other hand, it is determined in step 63 that there is a demand for the internal combustion engine to be in the turbocharged state, then step 66 is executed, in which case post S poisoning regeneration ECV and wastegate valve opening amount control II is executed. That is, in step 66, the turbocharged side exhaust gas control valve 16A is fully closed and the naturally-aspirated side exhaust gas control valve 16B is fully opened.

Then in step 65, it is determined whether the NOx catalyst temperature Tn is equal to or less than a NOx retaining and purifying upper limit temperature Tnmax (i.e., whether $Tn \leqq Tnmax$). If it is determined that Tn is equal to or less than Tnmax, the routine ends. If, on the other hand, it is determined that Tn is greater than Tnmax, steps 62 and thereafter are performed as appropriate.

In the rich/lean burn control described above, the torque output from combustion in the cylinder groups can be made uniform, which is advantageous, if the ignition timing of the rich burn cylinder group is retarded with respect to the ignition timing of the lean burn cylinder group, and more particularly, if the ignition timing of the rich burn cylinder group is retarded with respect to the reference ignition timing and the ignition timing of the lean burn cylinder group is advanced with respect to the reference ignition timing.

Also, in the rich/lean burn control described above, either the turbocharged side cylinder group 2A or the naturally-aspirated side cylinder group 2B may be the rich burn cylinder group (i.e., either the turbocharged side cylinder group 2A or the naturally-aspirated side cylinder group 2B may be the lean burn cylinder group). However, the overheating of the naturally-aspirated side three way catalyst 14B can be suppressed particularly well when the turbocharged side cylinder group 2A is the rich burn cylinder group and the naturally-aspirated side cylinder group 2B is the lean burn cylinder group. That is, the temperature of the exhaust gas discharged from the rich burn cylinder group is relatively high so if the naturally-aspirated side cylinder group 2B is the rich burn cylinder group, high temperature exhaust gas will flow directly into the naturally-aspirated side three way catalyst 14B, thus possibly causing the three way catalyst 14B to overheat. However, if the turbocharged side cylinder group 2A is the rich burn cylinder group, high temperature exhaust gas does not flow into the naturally-aspirated side three way catalyst 14B so overheating of the naturally-aspirated side three way catalyst 14B can be suppressed. Incidentally, if the turbocharged side cylinder group 2A is the rich burn cylinder group, high temperature exhaust gas is discharged from the turbocharged side cylinder group 2A, but this exhaust gas flows into the turbocharged side three way catalyst 14A after first passing through the exhaust turbine 13 of the turbocharger 11. In this case, the heat capacity of the exhaust turbine 13 is relatively large so when the exhaust gas passes through the exhaust turbine 13, the temperature of the exhaust gas drops. Therefore, even if rich burn is performed in the turbocharged side cylinder group 2A, only exhaust gas that has a relatively low temperature flows into the turbocharged side three way catalyst 14A so the turbocharged side three way catalyst 14A will not overheat.

In the rich/lean burn control described above, only rich burn is performed in one of the cylinder groups and only lean burn is performed in the other cylinder group. Alternatively, however, rich burn and lean burn may be performed alternately in both of the cylinder groups. That is, rich burn may be performed in one cylinder group while lean burn is performed in the other cylinder group, and then lean burn may be performed in the cylinder group in which rich burn was performed, while rich burn is performed in the cylinder group in which lean burn was performed.

Also, in the foregoing example embodiment, the S poisoning regeneration opening amount control is always executed during the rich/lean burn control. Alternatively, for example, the temperature of the naturally-aspirated side three way catalyst 14B may be monitored during the rich/lean burn control and the S poisoning regeneration opening amount control executed when the temperature of the three way catalyst 14B is higher than a predetermined temperature.

Next, an exhaust gas control apparatus according to a seventh example embodiment of the invention will be described. The internal combustion engine to which the S poisoning regeneration control of the exhaust gas control apparatus according to the seventh example embodiment can be applied is the same as the internal combustion engine shown in FIG. 4. The NOx catalyst 15 purifies NOx when the temperature of the NOx catalyst 15 is equal to or greater than an activation temperature and equal to or less than a NOx retaining and purifying upper limit temperature. Therefore, in the exhaust gas control apparatus according to the seventh example embodiment, NOx catalyst temperature control for controlling the NOx catalyst temperature is performed so that the NOx catalyst temperature becomes equal to or greater than the activation temperature and equal to or less than the NOx retaining and purifying upper limit temperature. That is, more specifically, when the NOx catalyst temperature is higher than the NOx retaining and purifying upper limit temperature, the opening amount of the wastegate valve 21 is increased (preferably to fully open), the opening amount of the turbocharged side exhaust gas control valve 16A is increased (also preferably to fully open), and the opening amount of the naturally-aspirated side exhaust gas control valve 16B is reduced (preferably to fully closed) on the condition that there is a demand for the internal combustion engine to be in the naturally-aspirated state. Accordingly, the amount of exhaust gas that flows through the bypass passage 22 of the turbocharger 11 and into the NOx catalyst 15, of the exhaust gas that was discharged from the turbocharged side cylinder group 2A, increases. The temperature of the exhaust gas that flows into the NOx catalyst 15 from the turbocharged side exhaust branch pipe 9A through the bypass passage 22 of the turbocharger 11 is lower than the temperature of the exhaust gas that flows into the NOx catalyst 15 from the naturally-aspirated side exhaust branch pipe 9B via the communicating pipe 17. Therefore, as a result, the NOx catalyst temperature decreases and before long is equal to or less than the NOx retaining and purifying upper limit temperature. Of course, at this time the naturally-aspirated state demanded of the internal combustion engine is also able to be achieved.

If, on the other hand, the NOx catalyst temperature is lower than the activation temperature, the turbocharged side exhaust gas control valve 16A is fully closed (or the opening amount may simply be decreased, but in this case it is preferable that the opening amount of the wastegate valve 21 be increased, and more preferably, be fully opened), and the opening amount of the naturally-aspirated side exhaust gas control valve 16B is increased (preferably to fully open) on the condition that the internal combustion engine is in the naturally-aspirated state. Accordingly, the amount of exhaust gas that flows into the NOx catalyst 15 from the naturally-aspirated side exhaust branch pipe 9B via the communicating pipe 17, of the exhaust gas that was discharged from the turbocharged side cylinder group 2A, increases. In this case, the temperature of the exhaust gas that flows into the NOx catalyst 15 from the naturally-aspirated side exhaust branch pipe 9B via the communicating pipe 17 is higher than the temperature of the exhaust gas that flows into the NOx catalyst 15 from the turbocharged side exhaust branch pipe 9A through the turbocharger 11. Therefore, as a result, the NOx catalyst temperature rises and before long is equal to or greater than the activation temperature. Of course, at this time the naturally-aspirated state demanded of the internal combustion engine is also able to be achieved.

Figure 13:
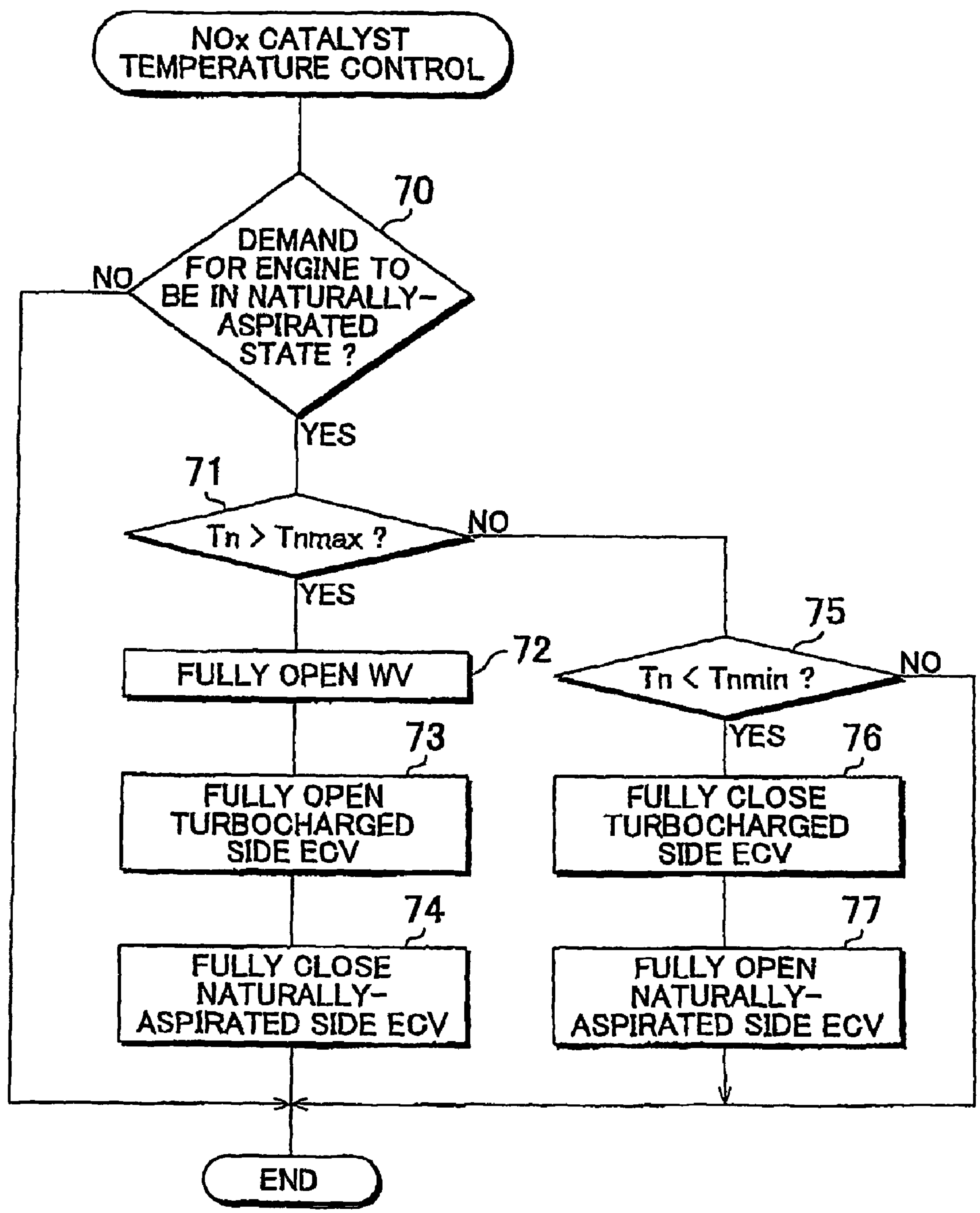
FIG. 13 is a flowchart illustrating one example of a routine for executing NOx catalyst temperature control of an exhaust gas control apparatus according to a seventh example embodiment of the invention.

FIG. 13 is a flowchart illustrating one example of a routine for executing NOx catalyst temperature control of the exhaust gas control apparatus according to the seventh example embodiment. In the routine shown in FIG. 13, it is first determined in step 70 whether there is a demand for the internal combustion engine to be in the naturally-aspirated state. If it is determined that there is no demand for the internal combustion engine to be in the naturally-aspirated state, the routine directly ends. If, on the other hand, it is determined that there is a demand for the internal combustion engine to be in the naturally-aspirated state, the process proceeds on to step 71 where it is determined whether the NOx catalyst temperature Tn is higher than a NOx retaining and purifying upper limit temperature Tnmax (i.e., whether Tn>Tnmax). If it is determined that Tn is greater than Tnmax, step 72 is executed in which case the wastegate valve 21 is fully opened. Then the turbocharged side exhaust gas control valve 16A is fully opened in step 73 and the naturally-aspirated side exhaust gas control valve 16B is fully closed in step 74.

If, on the other hand, it is determined that Tn is equal to or less than Tnmax, then the process proceeds on to step 75 where it is determined whether the NOx catalyst temperature Tn is lower than an activation temperature Tnmin (i.e., whether Tn<Tnmin). If it is determined that Tn is less than Tnmin, the process proceeds on to step 76 where the turbocharged side exhaust gas control valve 16A is fully closed, after which the naturally-aspirated side exhaust gas control valve 16B is fully opened in step 77.

Next, NOx catalyst temperature control of the exhaust gas control apparatus according to an eighth example embodiment of the invention will be described. The internal combustion engine to which the NOx catalyst temperature control of the exhaust gas control apparatus according to the eighth example embodiment can be applied is the same as the internal combustion engine shown in FIG. 4. When a state in which the engine speed is relatively low and the engine load is relatively small is referred to as a light load state, a state in which the engine speed is relatively high or the engine load is relatively large is referred to as a high load state, and any other state is referred to as a medium load state, the NOx catalyst temperature control of the exhaust gas control apparatus according to the eighth example embodiment is performed when the internal combustion engine is operating in the medium load state. That is, when the internal combustion engine is operating in the medium load state, the exhaust gas control valves 16A and 16B are controlled so that the amount of exhaust gas that flows into the NOx catalyst 15 from the turbocharged side exhaust branch pipe 9A through the turbocharger 11 increases when the NOx catalyst temperature is higher than a target temperature (which is a temperature equal to or greater than the activation temperature and equal to or less than the NOx retaining and purifying upper limit temperature), and the opening amounts of the exhaust gas control valves 16A and 16B are controlled so that the amount of exhaust gas that flows into the NOx catalyst 15 from the naturally-aspirated side exhaust branch pipe 9B increases when the NOx catalyst temperature is lower than the target temperature.

Accordingly, the NOx catalyst temperature is lowered when the NOx catalyst temperature is higher than the target temperature and raised when it is lower than the target temperature such that it can be controlled to the target temperature. That is, the temperature of the exhaust gas that flows into the NOx catalyst 15 from the naturally-aspirated side exhaust branch pipe 9B is higher than the temperature of the exhaust gas that flows into the NOx catalyst 15 from the turbocharged side exhaust branch pipe 9A through the turbocharger 11. Thus, according to the eighth example embodiment, when the NOx catalyst temperature is higher than the target temperature, the amount of exhaust gas that flows into the NOx catalyst 15 from the turbocharged side exhaust branch pipe 9A through the turbocharger 11 is increased so the temperature of the exhaust gas that flows into the NOx catalyst 15 becomes relatively lower, thus lowering the NOx catalyst temperature. On the other hand, when the NOx catalyst temperature is lower than the target temperature, the amount of exhaust gas that flows into the NOx catalyst 15 from the naturally-aspirated side exhaust branch pipe 9B is increased SQ the temperature of the exhaust gas that flows into the NOx catalyst 15 becomes relatively higher, thus raising the NOx catalyst temperature. As a result, the NOx catalyst temperature can be controlled to the target temperature.

When controlling the NOx catalyst temperature to the target temperature in the manner described above, the opening amounts of the exhaust gas control valves 16A and 16B may be controlled as follows, for example. That is, when the amount of exhaust gas flowing into the NOx catalyst 15 is set to 100%, in order to make the NOx catalyst temperature match the target temperature, the fraction Fturbo of the amount of exhaust gas to be supplied to the NOx catalyst 15 from the turbocharged side exhaust branch pipe 9A through the turbocharger 11 is calculated according to Expression (1) below and the fraction Fna of the amount of exhaust gas to be supplied to the NOx catalyst 15 from the naturally-aspirated side exhaust branch pipe 9B is calculated according to Expression (2) below.

$$Fturbo=(Tnb-Tnna\times 100)/Tnturbo-Tnna) \quad (1)$$

$$Fna=100-Dturbo \quad (2)$$

Here, Tnb is the target temperature; Tnna is the NOx catalyst temperature achieved when all of the exhaust gas discharged from both cylinder groups 2A and 2B is made to flow into the NOx catalyst 15 via the naturally-aspirated side exhaust branch pipe 9B, and is read from a map according to the engine speed and engine load, for example; and Tnturbo is the NOx catalyst temperature achieved when all of the exhaust gas discharged from both cylinder groups 2A and 2B is made to flow into the NOx catalyst 15 via the exhaust turbine 13 and the turbocharged side exhaust branch pipe 9A, for example, and is read from a map according to the engine speed and engine load, for example.

The opening amounts of the exhaust gas control valves 16A and 16B are controlled so that the fraction of the amount of exhaust gas that flows into the NOx catalyst 15 from the turbocharged side exhaust branch pipe 9A through the turbocharger 11 becomes equal to the fraction Fturbo that was calculated as described above, and the fraction of the amount of exhaust gas that flows into the NOx catalyst 15 from the naturally-aspirated side exhaust branch pipe 9B becomes equal to the fraction Fna that was calculated as described above.

Figure 14:
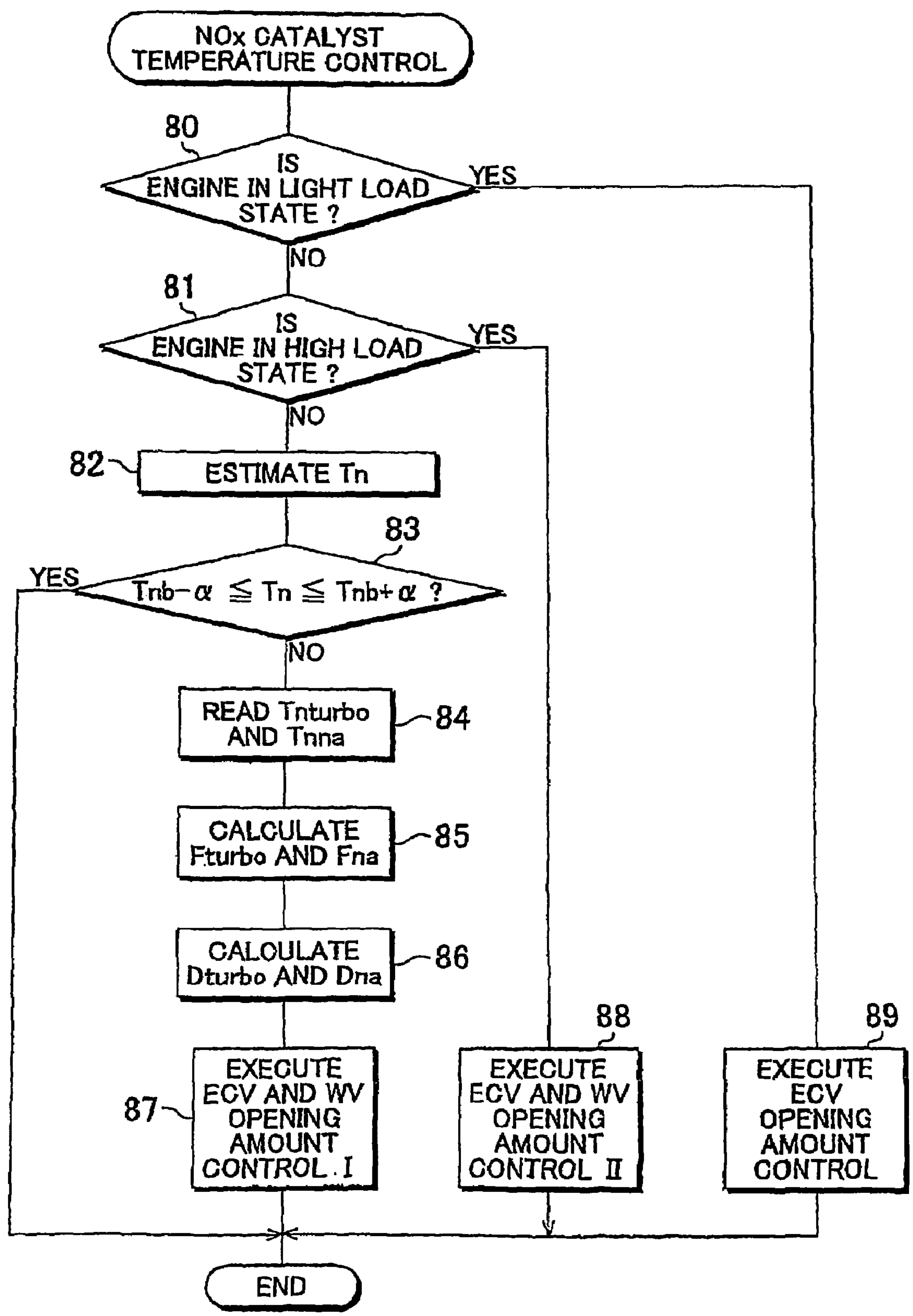
FIG. 14 is a flowchart illustrating one example of a routine for executing NOx catalyst temperature control of an exhaust gas control apparatus according to an eighth example embodiment of the invention.

FIG. 14 is a flowchart illustrating one example of a routine for executing NOx catalyst temperature control of the exhaust gas: control apparatus according to the eighth example embodiment. In the routine in FIG. 14, first it is determined in step 80 whether the internal combustion engine is operating in the light load state. If it is determined that the internal combustion engine is operating in the light load state, the process proceeds on to step 89 where ECV opening amount control is executed. That is, in step 89, the naturally-aspirated side exhaust gas control valve 16B is fully opened and the turbocharged side exhaust gas control valve 16A is fully closed. If, on the other hand, it is determined in step 80 that the internal combustion engine is not operating in the light load state, the process proceeds on to step 81 where it is determined whether the internal combustion engine is operating in the high load state.

If it is determined in step 81 that the internal combustion engine is operating in the high load state, the process proceeds on to step 88 where ECV and wastegate valve opening amount control II is executed. That is, the naturally-aspirated side exhaust gas control valve 16B is fully closed and the turbocharged side exhaust gas control valve 16A is fully opened while the wastegate valve 21 is fully closed. If, on the other hand, it is determined in step 81 that the internal combustion engine is not operating in the high load state, the process proceeds on to step 82 where a NOx catalyst temperature Tn is estimated.

Next, it is determined in step 83 whether the NOx catalyst temperature Tn that was estimated in step 82 is within a set temperature $\alpha$ range with respect to a target temperature Tnb (i.e., whether $Tnb-\alpha \leqq Tn \leqq Tnb+\alpha$). If it is determined that $Tnb-\alpha \leqq Tn \leqq Tnb+\alpha$, then the routine directly ends. On the other hand, if it is determined that $Tn<Tnb-\alpha$ or that $Tn>Tnb+\alpha$, the process proceeds on to step 84 where i) a NOx catalyst temperature Tnturbo that is reached when all of the exhaust gas discharged from both of the cylinder groups 2A and 2B is made to flow into the NOx catalyst 15 via the exhaust turbine 13 and the turbocharged side exhaust branch pipe 9A is read from a map based on the engine speed and the engine load, and ii) a NOx catalyst temperature Tnna that is reached when all of the exhaust gas discharged from both of the cylinder groups 2A and 2B is made to flow into the NOx catalyst 15 via the naturally-aspirated side exhaust branch pipe 9B is read from a map based on the engine speed and the engine load.

Next in step 85, in order to make the NOx catalyst temperature match the target temperature, the fraction Fturbo of the amount of exhaust gas to be supplied to the NOx catalyst 15 from the turbocharged side exhaust branch pipe 9A through the turbocharger 11 is calculated according to Expression (1) above and the fraction Fna of the amount of exhaust gas to be supplied to the NOx catalyst 15 from the naturally-aspirated side exhaust branch pipe 9B is calculated according to Expression (2) above. Then in step 86, an opening amount Dturbo of the turbocharged side exhaust gas control valve 16A, in which the fraction of the amount of exhaust gas that flows into the NOx catalyst 15 from the turbocharged side exhaust branch pipe 9A through the turbocharger 11 is made to match the fraction Fturbo that was calculated in step 85, is calculated from a map. Similarly, an opening amount Dna of the naturally-aspirated side exhaust gas control valve 16B, in which the fraction of the amount of exhaust gas that flows into the NOx catalyst 15 from the naturally-aspirated side exhaust branch pipe 9B is made to match the fraction Fna that was calculated in step 85, is calculated from a map.

Next in step 87, the ECV and wastegate valve opening amount control I is executed. That is, in step 87, the wastegate valve 21 is fully closed, the opening amount of the turbocharged side exhaust gas control valve 16A is made to match the opening amount Dturbo that was calculated in step 86, and the opening amount of the naturally-aspirated side exhaust gas control valve 16B is made to match the opening amount Dna that was calculated in step 86.

Next, an exhaust gas control apparatus according to a ninth example embodiment of the invention will be described. The internal combustion engine to which the exhaust gas control apparatus according to the ninth example embodiment can be applied is the same as the internal combustion engine shown in FIG. 4. In the exhaust gas control apparatus according to the ninth example embodiment, when it predicted that the state demanded of the internal combustion engine will change from the naturally-aspirated state to the turbocharged state, NOx catalyst temperature and boost pressure control which controls the boost pressure of the turbocharger 11 to a target boost pressure and also controls the NOx catalyst temperature to a target temperature is executed. That is, when it predicted that the state demanded of the internal combustion engine will change from the naturally-aspirated state to the turbocharged state and the NOx catalyst temperature is lower than the target temperature, the wastegate valve 21 is fully closed while the turbocharged side exhaust gas control valve 16A is opened such that exhaust gas flows through the exhaust turbine 13. In addition, at least the naturally-aspirated side exhaust gas control valve 16B is opened and the boost pressure is controlled to the target boost pressure by controlling the opening amount of the naturally-aspirated side exhaust gas control valve 16B.

More specifically, when the boost pressure is higher than the target boost pressure, the opening amount of the naturally-aspirated side exhaust gas control valve 16B is increased. When the boost pressure is lower than the target boost pressure, the opening amount of the naturally-aspirated side exhaust gas control valve 16B is decreased. Accordingly, some of the exhaust gas that flows into the NOx catalyst 15 does not pass through the turbocharger 11, which raises the NOx catalyst temperature. As a result, the NOx catalyst temperature reaches, or at least approaches, the target temperature.

On the other hand, when it predicted that the state demanded of the internal combustion engine will change from the naturally-aspirated state to the turbocharged state and the NOx catalyst temperature is higher than the target temperature, the naturally-aspirated side exhaust gas control valve 16B is fully closed and the turbocharged side exhaust gas control valve 16A is opened such that exhaust gas flows through the exhaust turbine 13. In addition, the boost pressure is controlled to the target boost pressure by controlling the opening amount of the wastegate valve 21. More specifically, when the boost pressure is higher than the target boost pressure, the opening amount of the wastegate valve 21 is increased. When the boost pressure is lower than the target boost pressure, the opening amount of the wastegate valve 21 is decreased. Accordingly, all of the exhaust gas that flows into the NOx catalyst 15 has passed through the turbocharger 11, which lowers the NOx catalyst temperature. As a result, the NOx catalyst temperature reaches, or at least approaches, the target temperature.

Figure 15:
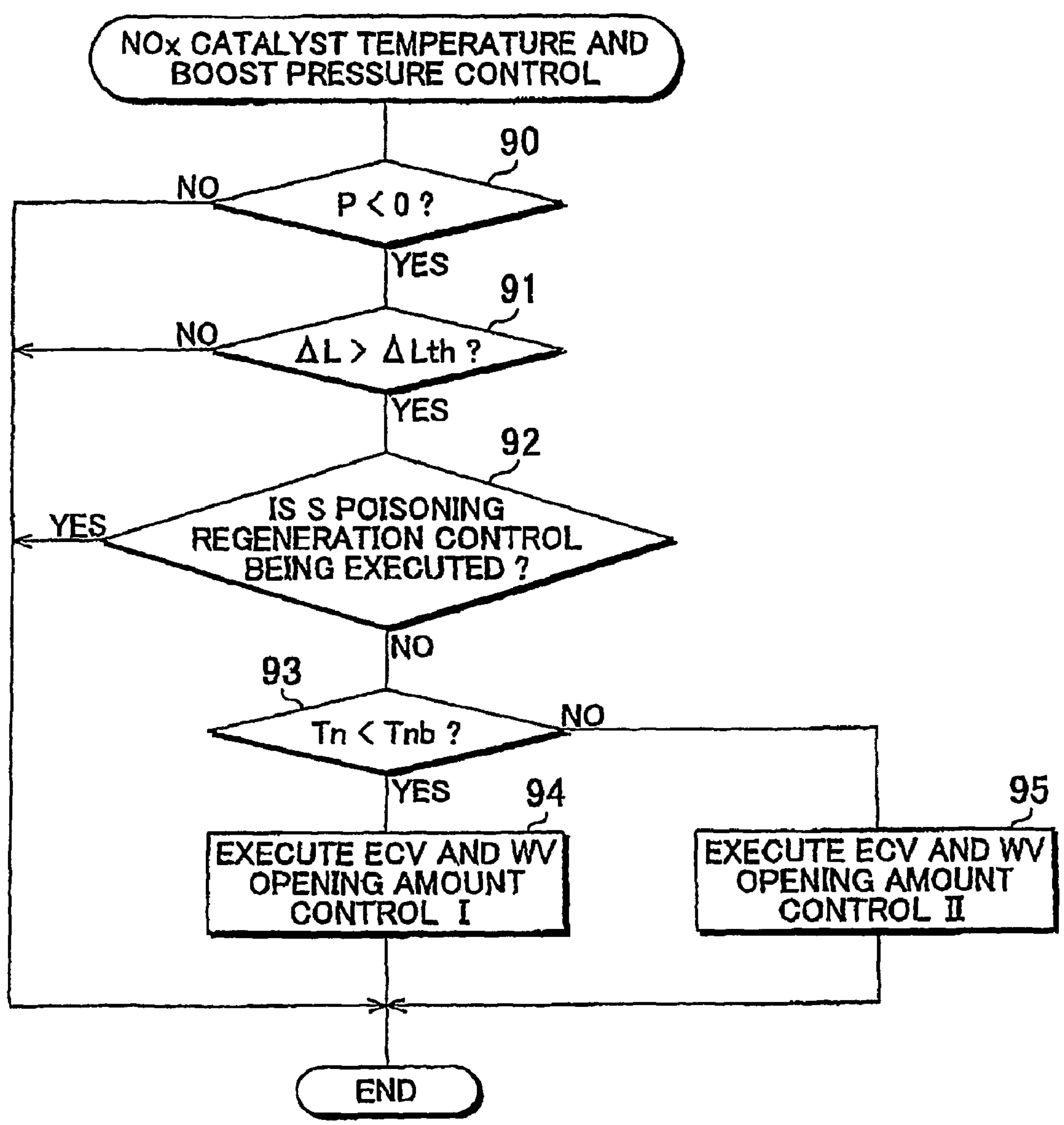
FIG. 15 is a flowchart illustrating one example of a routine for executing NOx catalyst temperature and boost pressure control of an exhaust gas control apparatus according to a ninth example embodiment of the invention.

FIG. 15 is a flowchart illustrating one example of a routine for executing NOx catalyst temperature and boost pressure control of the exhaust gas control apparatus according to the ninth example embodiment. In the routine shown in FIG. 15, first it is determined in step 90 whether a pressure P inside the intake pipe 8 downstream of the compressor 12 of the turbocharger 11 is a negative pressure (i.e., whether $P<0$), i.e., whether the internal combustion engine is in the naturally-aspirated state. If it is determined that P is equal to or greater than 0, the routine directly ends. If, on the other hand, it is determined that P is less than 0, the process proceeds on to step 91 where it is determined whether an increase amount $\Delta L$ in the engine load per unit time is greater than a predetermined amount $\Delta Lth$ (i.e., whether $\Delta L>\Delta Lth$), i.e., whether it is predicted that the state demanded of the internal combustion engine will change from the naturally-aspirated state to the turbocharged state. That is, in the internal combustion engine to which the exhaust gas control apparatus according to the ninth example embodiment, the state demanded of the internal combustion engine changes to the turbocharged state when the engine load becomes large so it is determined in step 91 whether the state demanded of the internal combustion engine will change from the naturally-aspirated state to the turbocharged state based on the increase amount in the engine load per unit time.

If it is determined in step 91 that $\Delta L$ is equal to or less than $\Delta Lth$, the routine directly ends. If, on the other hand, it is determined that $\Delta L$ is greater than $\Delta Lth$, the process proceeds on to step 92 where it is determined whether S poisoning regeneration control is being executed. If it is determined that the S poisoning regeneration control is being executed, the routine directly ends. If, on the other hand it is determined that the S poisoning regeneration control is not being executed, the process proceeds on to step 93 where it is determined whether the NOx catalyst temperature Tn is less than the target temperature Tnb (i.e., whether $Tn<Tnb$).

If it is determined in step 93 that Tn is less than Tnb, the process proceeds on to step 94 where the ECV and wastegate valve opening amount control I is executed. That is, in step 94, the wastegate valve 21 is fully closed, the turbocharged side exhaust gas control valve 16A is fully opened, and the opening amount of the naturally-aspirated side exhaust gas control valve 16B is controlled so that the boost pressure comes to match the target boost pressure. If, on the other hand, it is determined in step 93 that Tn is equal to or greater than Tnb, the process proceeds on to step 95 where the ECV and wastegate valve opening amount control II is executed. That is, in step 95, the naturally-aspirated side exhaust gas control valve 16B is fully closed, the turbocharged side exhaust gas control valve 16A is fully opened, and the opening amount of the wastegate valve 21 is controlled so that the boost pressure comes to match the target boost pressure.

Figure 16:
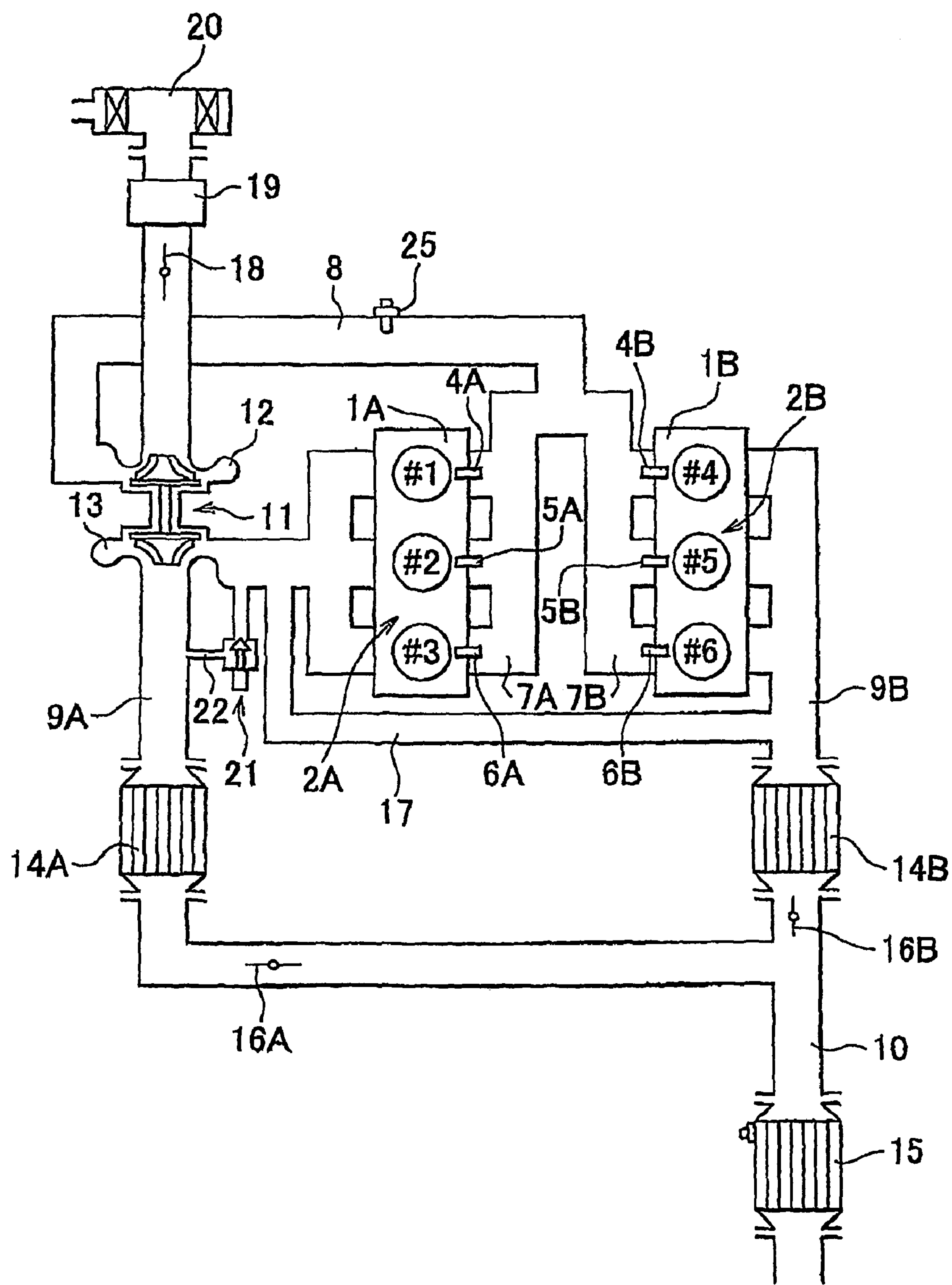
FIG. 16 is a block diagram schematically showing the structure of an internal combustion engine to which the exhaust gas control apparatus according to any one of the seventh to the ninth example embodiments of the invention can be applied.

Incidentally, the exhaust gas control apparatuses according to the seventh to the ninth example embodiments utilize the fact that the temperature of the exhaust gas that flows into the NOx catalyst 15 is reduced by increasing the amount of exhaust gas that passes through the turbocharger 11. In relation to this, to further promote a decrease in the temperature of the exhaust gas that flows into the NOx catalyst through the turbocharger 11, as shown in FIG. 16, the length of the turbocharged side exhaust branch pipe 9A may be made longer than the length of the turbocharged side exhaust branch pipe 9A shown in FIG. 1, for example, the pipe diameter of the exhaust branch pipe 9A downstream of the turbocharged side three way catalyst 14A may be increased, or the exhaust branch pipe 9A downstream of the turbocharged side three way catalyst 14A may be formed of a plurality of pipes.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. An exhaust gas control apparatus of an internal combustion engine having a first cylinder and a second cylinder, comprising:

- a first exhaust pipe connected to the first cylinder;
- a second exhaust pipe connected to the second cylinder;
- a communicating pipe that connects together an intermediate portion of the first exhaust pipe and an intermediate portion of the second exhaust pipe;
- an exhaust gas control catalyst arranged in the second exhaust pipe downstream of the intermediate portion to which the communicating pipe is connected; and
- an exhaust gas amount reducing device which reduces an amount of exhaust gas that flows from the first exhaust pipe into the second exhaust pipe through the communicating pipe during execution of a rich/lean burn control which performs combustion with an air-fuel ratio of an air-fuel mixture that is richer than the stoichiometric air-fuel ratio in one of the first cylinder and second cylinder, and performs combustion with an air-fuel ratio of an air-fuel mixture that is leaner than the stoichiometric air-fuel ratio in the other cylinder.

2. The exhaust gas control apparatus of an internal combustion engine according to claim 1, wherein the exhaust gas amount reducing device reduces the amount of exhaust gas that flows from the first exhaust pipe into the second exhaust pipe through the communicating pipe when a temperature of the exhaust gas control catalyst is higher than a predetermined temperature.

3. The exhaust gas control apparatus of an internal combustion engine according to claim 1, wherein the exhaust gas amount reducing device reduces the amount of exhaust gas that flows from the first exhaust pipe into the second exhaust pipe through the communicating pipe by increasing a pressure in the second exhaust pipe upstream of the exhaust gas control catalyst.

4. The exhaust gas control apparatus of an internal combustion engine according to claim 3, further comprising;

an exhaust gas control valve which changes a flow path area of the second exhaust pipe and is arranged in the second exhaust pipe downstream of the intermediate portion to which the communicating pipe is connected, wherein the exhaust gas amount reducing device increases the pressure in the second exhaust pipe upstream of the exhaust gas control catalyst by reducing the flow path area of the second exhaust pipe using the exhaust gas control valve.

5. The exhaust gas control apparatus of an internal combustion engine according to claim 1, wherein the exhaust gas amount reducing device reduces the amount of exhaust gas that flows from the first exhaust pipe into the second exhaust pipe through the communicating pipe by decreasing the pressure in the first exhaust pipe upstream of the intermediate portion to which the communicating pipe is connected.

6. The exhaust gas control apparatus of an internal combustion engine according to claim 5, further comprising:

an exhaust gas control valve which changes the flow path area of the first exhaust pipe and is arranged in the first exhaust pipe downstream of the intermediate portion to which the communicating pipe is connected, wherein the exhaust gas amount reducing device decreases the pressure in the first exhaust pipe upstream of the intermediate portion to which the communicating pipe is connected by increasing the flow path area of the first exhaust pipe using the exhaust gas control valve.

7. The exhaust gas control apparatus of an internal combustion engine according to claim 1, further comprising:

an exhaust turbine of a turbocharger, which is arranged in the first exhaust pipe downstream of the intermediate portion to which the communicating pipe is connected.

8. The exhaust gas control apparatus of an internal combustion engine according to claim 5, further comprising:

an exhaust turbine of a turbocharger, which is arranged in the first exhaust pipe downstream of the intermediate portion to which the communicating pipe is connected, wherein the exhaust gas amount reducing device decreases the pressure in the first exhaust pipe upstream of the intermediate portion to which the communicating pipe is connected by increasing an opening amount of a wastegate valve of the turbocharger.

9. The exhaust gas control apparatus of an internal combustion engine according to claim 1, further comprising:

a communication control valve which changes a flow path area of the communicating pipe and is arranged in the communicating pipe, wherein the exhaust gas amount reducing device reduces the amount of exhaust gas that flows from the first exhaust pipe into the second exhaust pipe through the communicating pipe by reducing the flow path area of the communicating pipe using the communication control valve.

10. The exhaust gas control apparatus of an internal combustion engine according to claim 1, further comprising:

a single common exhaust pipe that is connected to a downstream end of the first exhaust pipe and a downstream end of the second exhaust pipe; and an exhaust gas control catalyst which is separate from the exhaust gas control catalyst and arranged in the common exhaust pipe, wherein the rich/lean burn control is executed so as to supply exhaust gas of a rich air-fuel ratio and exhaust gas of a lean air-fuel ratio to the exhaust gas control catalyst arranged in the common exhaust pipe.

11. The exhaust gas control apparatus of an internal combustion engine according to claim 1, further comprising:

an exhaust gas control catalyst arranged in the first exhaust pipe downstream of the intermediate portion to which the communicating pipe is connected.

12. An exhaust gas control apparatus of an internal combustion engine having a first cylinder and a second cylinder, comprising:

a first exhaust pipe connected to the first cylinder;

a second exhaust pipe connected to the second cylinder;

a communicating pipe that connects together an intermediate portion of the first exhaust pipe and an intermediate portion of the second exhaust pipe;

a single common exhaust pipe which is connected to a downstream end of the first exhaust pipe and a downstream end of the second exhaust pipe;

an exhaust gas control catalyst arranged in the common exhaust pipe;

an exhaust turbine of a turbocharger, which is arranged in the first exhaust pipe downstream of the intermediate portion to which the communicating pipe is connected; and an exhaust gas amount control apparatus which executes an exhaust gas control that controls i) an amount of exhaust gas that flows through the first exhaust pipe and into the exhaust gas control catalyst from the downstream end of the first exhaust pipe and ii) the amount of exhaust gas that flows through the second exhaust pipe and into the exhaust gas control catalyst from the downstream end of the second exhaust pipe such that a temperature of the exhaust gas control catalyst becomes equal to or close to a target temperature.

13. The exhaust gas control apparatus of an internal combustion engine according to claim 12, wherein the exhaust gas amount control apparatus controls i) the amount of exhaust gas that flows through the first exhaust pipe and into the exhaust gas control catalyst from the downstream end of the first exhaust pipe and ii) the amount of exhaust gas that flows through the second exhaust pipe and into the exhaust gas control catalyst from the downstream end of the second exhaust pipe by controlling a pressure in the first exhaust pipe.

14. The exhaust gas control apparatus of an internal combustion engine according to claim 13, further comprising:

an exhaust gas control valve which changes a flow path area of the first exhaust pipe and is arranged in the first exhaust pipe downstream of the intermediate portion to which the communicating pipe is connected, wherein the exhaust gas amount control apparatus controls the pressure in the first exhaust pipe by controlling an opening amount of the exhaust gas control valve.

15. The exhaust gas control apparatus of an internal combustion engine according to claim 13, wherein the turbocharger includes a wastegate valve, and the exhaust gas amount control apparatus controls the pressure in the first exhaust pipe by controlling the opening amount of the wastegate valve.

16. The exhaust gas control apparatus of an internal combustion engine according to claim 12, wherein the exhaust gas amount control apparatus controls i) the amount of exhaust gas that flows through the first exhaust pipe and into the exhaust gas control catalyst from the downstream end of the first exhaust pipe and ii) the amount of exhaust gas that flows through the second exhaust pipe and into the exhaust gas control catalyst from the downstream end of the second exhaust pipe by controlling the pressure in the second exhaust pipe.

17. The exhaust gas control apparatus of an internal combustion engine according to claim 16, further comprising:

an exhaust gas control valve which changes the flow path area of the second exhaust pipe and is arranged in the second exhaust pipe downstream of the intermediate portion to which the communicating pipe is connected, wherein the exhaust gas amount control apparatus controls the pressure in the second exhaust pipe by controlling the opening amount of the exhaust gas control valve.

18. The exhaust gas control apparatus of an internal combustion engine according to claim 12, wherein the exhaust gas amount control apparatus increases the amount of exhaust gas that flows through the first exhaust pipe and into the exhaust gas control catalyst from the downstream end of the first exhaust pipe when a temperature of the exhaust gas control catalyst is higher than a target temperature, and increases the amount of the exhaust gas that flows through the second exhaust pipe and into the exhaust gas control catalyst from the downstream end of the second exhaust pipe when the temperature of the exhaust gas control catalyst is lower than the target temperature.

19. The exhaust gas control apparatus of an internal combustion engine according to claim 12, wherein the exhaust gas amount control apparatus controls, in accordance with a load of the internal combustion engine during execution of the exhaust gas amount control, the amount of exhaust gas that flows through the first exhaust pipe and into the exhaust gas control catalyst from the downstream end of the first exhaust pipe such that the amount of exhaust gas that passes through the exhaust turbine of the turbocharger becomes equal to or close to a target amount.

20. An exhaust gas control apparatus of an internal combustion engine having a first cylinder and a second cylinder, comprising:

a first exhaust pipe connected to the first cylinder;

a second exhaust pipe connected to the second cylinder;

a communicating pipe that connects together an intermediate portion of the first exhaust pipe and an intermediate portion of the second exhaust pipe;

a single common exhaust pipe which is connected to a downstream end of the first exhaust pipe and a downstream end of the second exhaust pipe;

an exhaust gas control catalyst arranged in the common exhaust pipe;

an exhaust turbine of a turbocharger, which is arranged in the first exhaust pipe downstream of the intermediate portion to which the communicating pipe is connected, wherein a rich/lean burn control is executed which performs combustion with an air-fuel ratio of an air-fuel mixture that is richer than the stoichiometric air-fuel ratio in one of the first cylinder and second cylinder, and performs combustion with an air-fuel ratio of an air-fuel mixture that is leaner than the stoichiometric air-fuel ratio in the other cylinder, and exhaust gas of a rich air-fuel ratio and exhaust gas of a lean air-fuel ratio are supplied to the exhaust gas control catalyst in order to raise the temperature of the exhaust gas control catalyst when the exhaust gas control catalyst is in a predetermined state; and an exhaust gas amount control apparatus which executes an exhaust gas amount control that increases the amount of exhaust gas that flows through the second exhaust pipe and into the exhaust gas control catalyst from the downstream end of the second exhaust pipe before the rich/lean burn control is executed.

21. The exhaust gas control apparatus of an internal combustion engine according to claim 20, wherein the exhaust gas amount control apparatus increases the amount of exhaust gas that flows through the second exhaust pipe and into the exhaust gas control catalyst from the downstream end of the second exhaust pipe by decreasing the pressure in the second exhaust pipe.

22. The exhaust gas control apparatus of an internal combustion engine according to claim 21, further comprising:

an exhaust gas control valve which changes a flow path area of the second exhaust pipe and is arranged in the second exhaust pipe downstream of the intermediate portion to which the communicating pipe is connected, wherein the exhaust gas amount control apparatus decreases the pressure in the second exhaust pipe by increasing an opening amount of the exhaust gas control valve.

23. The exhaust gas control apparatus of an internal combustion engine according to claim 20, wherein the exhaust gas amount control apparatus increases the amount of exhaust gas that flows through the second exhaust pipe and into the exhaust gas control catalyst from the downstream end of the second exhaust pipe by increasing the pressure in the first exhaust pipe.

24. The exhaust gas control apparatus of an internal combustion engine according to claim 23, further comprising:

an exhaust gas control valve which changes the flow path area of the first exhaust pipe and is arranged in the first exhaust pipe downstream of the intermediate portion to which the communicating pipe is connected, wherein the exhaust gas amount control apparatus increases the pressure in the first exhaust pipe by reducing the opening amount of the exhaust gas control valve.

25. The exhaust gas control apparatus of an internal combustion engine according to claim 23, wherein the turbocharger includes a wastegate valve and the exhaust gas amount control apparatus increases the pressure in the first exhaust pipe by reducing an opening amount of the wastegate valve.

26. The exhaust gas control apparatus of an internal combustion engine according to claim 20, wherein combustion in which the air-fuel ratio of the air-fuel mixture is the stoichiometric air-fuel ratio is performed in the second cylinder when the exhaust gas amount control apparatus is executing the exhaust gas amount control.

27. The exhaust gas control apparatus of an internal combustion engine according to claim 26, wherein combustion in which the air-fuel ratio of the air-fuel mixture is the stoichiometric air-fuel ratio is performed in the first cylinder when the exhaust gas amount control apparatus is executing the exhaust gas amount control.

28. An exhaust gas control apparatus of an internal combustion engine having a first cylinder and a second cylinder, comprising:

a first exhaust pipe connected to the first cylinder;

a second exhaust pipe connected to the second cylinder;

a communicating pipe that connects together an intermediate portion of the first exhaust pipe and an intermediate portion of the second exhaust pipe;

a single common exhaust pipe which is connected to a downstream end of the first exhaust pipe and a downstream end of the second exhaust pipe;

an exhaust gas control catalyst arranged in the common exhaust pipe;

an exhaust turbine of a turbocharger, which is arranged in the first exhaust pipe downstream of the intermediate portion to which the communicating pipe is connected, wherein a rich/lean burn control is executed which performs combustion with an air-fuel ratio of an air-fuel mixture that is richer than the stoichiometric air-fuel ratio in one of the first cylinder and second cylinder, and performs combustion with an air-fuel ratio of an air-fuel mixture that is leaner than the stoichiometric air-fuel ratio in the other cylinder, and exhaust gas of a rich air-fuel ratio and exhaust gas of a lean air-fuel ratio are supplied to the exhaust gas control catalyst in order to raise the temperature of the exhaust gas control catalyst when the exhaust gas control catalyst is in a predetermined state; and an exhaust gas amount control apparatus which executes an exhaust gas amount control that increases the amount of exhaust gas that flows through the first exhaust pipe and into the exhaust gas control catalyst from the downstream end of the first exhaust pipe when the rich/lean burn control has ended.

29. The exhaust gas control apparatus of an internal combustion engine according to claim 28, wherein the exhaust gas amount control apparatus increases the amount of exhaust gas that flows through the first exhaust pipe and into the exhaust gas control catalyst from the downstream end of the first exhaust pipe by decreasing the pressure in the first exhaust pipe.

30. The exhaust gas control apparatus of an internal combustion engine according to claim 29, further comprising:

an exhaust gas control valve which changes a flow path area of the first exhaust pipe and is arranged in the first exhaust pipe downstream of the intermediate portion to which the communicating pipe is connected, wherein the exhaust gas amount control apparatus decreases the pressure in the first exhaust pipe by increasing an opening amount of the exhaust gas control valve.

31. The exhaust gas control apparatus of an internal combustion engine according to claim 29, wherein the turbocharger includes a wastegate valve and the exhaust gas amount control apparatus decreases the pressure in the first exhaust pipe by increasing the opening amount of the wastegate valve.

32. The exhaust gas control apparatus of an internal combustion engine according to claim 28, wherein the exhaust gas amount control apparatus increases the amount of exhaust gas that flows through the first exhaust pipe and into the exhaust gas control catalyst from the downstream end of the first exhaust pipe by increasing the pressure in the second exhaust pipe.

33. The exhaust gas control apparatus of an internal combustion engine according to claim 31, further comprising:

an exhaust gas control valve which changes the flow path area of the second exhaust pipe and is arranged in the second exhaust pipe downstream of the intermediate portion to which the communicating pipe is connected, wherein the exhaust gas amount control apparatus increases the pressure in the second exhaust pipe by reducing the opening amount of the exhaust gas control valve.

* * * * *